ations, Delivery, Synchronization, and Error Protection," ATSC Advanced Television Systems Committee, Doc. S33-174r1, XP055435480, Jan. 5, 2016, pp. 1-123 (131 pages total).

United States Patent
Oh et al.

(10) Patent No.: US 10,939,149 B2
(45) Date of Patent: *Mar. 2, 2021

(54) APPARATUS AND METHOD FOR TRANSMITTING/RECEIVING PROCESSES OF A BROADCAST SIGNAL

(71) Applicant: LG ELECTRONICS INC., Seoul (KR)

(72) Inventors: Sejin Oh, Seoul (KR); Woosuk Kwon, Seoul (KR); Jangwon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/903,348

(22) Filed: Feb. 23, 2018

(65) Prior Publication Data

US 2018/0184136 A1 Jun. 28, 2018

Related U.S. Application Data

(63) Continuation of application No. 14/909,396, filed as application No. PCT/KR2015/007871 on Jul. 28, 2015, now Pat. No. 9,936,233.

(Continued)

(51) Int. Cl.
*H04N 21/2387* (2011.01)
*H04N 21/21* (2011.01)
(Continued)

(52) U.S. Cl.
CPC ......... *H04N 21/2387* (2013.01); *H04L 67/02* (2013.01); *H04L 69/326* (2013.01);
(Continued)

(58) Field of Classification Search
None
See application file for complete search history.

(56) References Cited

U.S. PATENT DOCUMENTS

2004/0165613 A1* 8/2004 Kim .................. H04L 49/90
370/463
2011/0295975 A1 12/2011 Yue et al.
(Continued)

FOREIGN PATENT DOCUMENTS

CN 101296246 A 10/2008
CN 103518351 A 1/2014
(Continued)

OTHER PUBLICATIONS

ATSC, "ATSC Candidate Standard: Signaling, Delivery, Synchronization, and Error Protection," ATSC Advanced Television Systems Committee, Doc. S33-174r1, XP055435480, Jan. 5, 2016, pp. 1-123 (131 pages total).

*Primary Examiner* — Justin E Shepard
(74) *Attorney, Agent, or Firm* — Birch, Stewart, Kolasch & Birch, LLP

(57) ABSTRACT

A broadcast reception apparatus includes a packet receiver to receive transport packets for signaling data through a dedicated transport channel, and receive transport packets for a delivery object through other transport channels, wherein the delivery object is a part of a file for video content of a broadcast service, a signaling parser to extract the signaling data including session description information and an extended file delivery table providing information about delivery of the file, and a data processor to recover the delivery object based on the signaling data, and generate location information for the file by substituting file template information included in the extended file delivery table with a Transport Object Identifier (TOI) in a header of a transport packet for the delivery object.

14 Claims, 22 Drawing Sheets

Related U.S. Application Data

(60) Provisional application No. 62/031,857, filed on Jul. 31, 2014.

(51) Int. Cl.

| | | |
|---|---|---|
| *H04N 21/235* | (2011.01) | |
| *H04N 21/20* | (2011.01) | |
| *H04N 21/233* | (2011.01) | |
| *H04N 21/232* | (2011.01) | |
| *H04N 21/234* | (2011.01) | |
| *H04N 21/218* | (2011.01) | |
| *H04N 21/236* | (2011.01) | |
| *H04N 21/23* | (2011.01) | |
| *H04N 21/238* | (2011.01) | |
| *H04L 29/08* | (2006.01) | |
| *H04N 21/2381* | (2011.01) | |
| *H04N 21/61* | (2011.01) | |

(52) U.S. Cl.
CPC ............ *H04N 21/20* (2013.01); *H04N 21/21* (2013.01); *H04N 21/218* (2013.01); *H04N 21/23* (2013.01); *H04N 21/232* (2013.01); *H04N 21/233* (2013.01); *H04N 21/234* (2013.01); *H04N 21/235* (2013.01); *H04N 21/236* (2013.01); *H04N 21/238* (2013.01); *H04N 21/2353* (2013.01); *H04N 21/2381* (2013.01); *H04N 21/23611* (2013.01); *H04N 21/6125* (2013.01)

(56) References Cited

U.S. PATENT DOCUMENTS

| | | | |
|---|---|---|---|
| 2012/0054235 A1* | 3/2012 | Kitazato | H04N 21/4622 707/770 |
| 2012/0259994 A1 | 10/2012 | Gillies et al. | |
| 2012/0288031 A1 | 11/2012 | Väre et al. | |
| 2013/0036234 A1 | 2/2013 | Pazos et al. | |
| 2013/0083795 A1 | 4/2013 | Kotecha | |
| 2013/0246643 A1* | 9/2013 | Luby | H04N 21/23439 709/231 |
| 2014/0098745 A1* | 4/2014 | Balasubramanian | H04W 72/005 370/328 |
| 2014/0173681 A1 | 6/2014 | Suh et al. | |
| 2014/0282792 A1* | 9/2014 | Bao | H04N 21/44004 725/116 |
| 2014/0307734 A1* | 10/2014 | Luby | H04L 65/608 370/390 |
| 2015/0172348 A1* | 6/2015 | Lohmar | H04L 65/607 709/219 |

FOREIGN PATENT DOCUMENTS

| | | |
|---|---|---|
| CN | 103858440 A | 6/2014 |
| WO | WO 2009/151265 A2 | 12/2009 |
| WO | WO 2013/107502 A1 | 7/2013 |

\* cited by examiner

FIG. 5

| Element or Attribute Name | | | Use | Description |
|---|---|---|---|---|
| LSID | | | | LCT Session Instance Description |
| | @version | | O | Version of this LCT Session Instance Description. The version is increased by one when the descriptor is updated. The received LSID with highest version number is the currently valid version. |
| | @validFrom | | O | The date and time from which the LSID is valid. The validFrom attribute may or may not be present. If not present, the receiver should assume the LSID version is valid immediately. |
| | @expiration | | O | The date and time when the LSID expires. The expiration attribute may or may not be present. If not present the receiver should assume the LSID is valid for all time, or until it receives a newer LSID with an associated expiration value. |
| | TransportSession | | 1..N | Provides information about LCT transport sessions |
| | | @tsi | M | Specifies the transport session identifier. The session identifiers must not be 0. |
| | | SourceFlow | 0..1 | Provides information of a source flow carried on this tsi |
| | | RepairFlow | 0..1 | Provides information of a repair flow carried on the tsi. For more details refer to Section 7 |
| Legend: | | | | |

For attributes: M=Mandatory, O=Optional, OD=Optional with Default Value, CM=Conditionally Mandatory.
For elements: <minOccurs>...<maxOccurs> (N=unbounded)
Note that the conditions only holds without using xlink:href. If linking is used, then all attributes are "optional" and <minOccurs =0>
Elements are bold, attributes are non bold and preceded with an @.

FIG. 6

| Element or Attribute Name | | | Use | Description |
|---|---|---|---|---|
| SourceFlow | | | | defines a source flow in session |
| | EFDT | | 0..1 | If provided, it specifies the details of the file delivery data. This is the extended FDT instance.<br>The EFDT may either be embedded or may be provided as a reference.<br>If provided as a reference the EFDT may be updated independently of the LSID.<br>If referenced, it shall be delivered as in-band object on TOI=0 of the included source flow.<br>The EFDT is further described in Section 6.3.2.3. |
| | @idRef | | 0..1 | Identification of the EFDT, it can be represented as a URI by the corresponding Transport Session. |
| | @realtime | | OD default: false | If not present it is false. If present and set to true, LCT packets contain extension headers including NTP timestamps objects the presentation time of the included delivery object. |
| | @minBufferSize | | O | Defines the maximum amount of data that needs to be stored in the receiver. This value may be present if @realtime is set to true. |
| | ApplicationIdentifier | | 0..1 | May provide additional information that can be mapped to the application that is carried in this transport session, e.g. Representation ID of a DASH [14] content or the Adaptation Set parameters of a DASH [14] Representation in order to select the LCT transport session for rendering. |
| | PayloadFormat | | 0..N | Defines payload formats of ROUTE packets carrying the objects of the source flow |
| | | @codePoint | OD default=0 | Defines what CodePoint value is used for this payload. This is the value of the CP field in the LCT header. When signalling this this value, the delivery of the object shall signalling this this value, the delivery of the object shall follow the rules below. |
| | | @deliveryObjectFormat | M | Specifies the payload format of the delivery object. For details see below. |
| | | @fragmentation | OD default=0 | 0: arbitrary<br>1: application specific (sample based)<br>2: application specific (a collection of boxes) |
| | | @deliveryOrder | OD default=0 | 0: arbitrary<br>1: in-order delivery<br>2: in-order delivery of media samples and prior to movie fragment box |
| | | @sourceFecPayloadID | OD default=1 | Defines the format of the Source FEC Payload ID. The following values are defined:<br>• 0: the source FEC payload ID is absent and the entire delivery object is contained in this packet. The FECParameters shall be absent.<br>• 1: the source FEC payload ID is 32 bit and expresses the start offset in the object. The FECParameters shall be absent.<br>• 2: the FECParameters defines the Format of the Source FEC Payload ID. |
| | | FECParameters | 0..1 | Defines the FEC parameters.<br>This includes the FEC-encoding-id, the instance-id, etc. It is specifically used to signal the applied Source FEC Payload ID. |

Legend:
    For attributes: M=Mandatory, O=Optional, OD=Optional with Default Value, CM=Conditionally Mandatory.
    For elements: <minOccurs> ... <maxOccurs> (N=unbounded)
    Note that the conditions only holds without using xlink:href. If linking is used, then all attributes are "optional" and <minOccurs=0>
Elements are bold; attributes are non-bold and preceded with an @.

| DeliveryObjectFormat IDValue Value | Meaning |
|---|---|
| 0 | Reserved |
| 1 | File Mode |
| 2 | Entity Mode |
| 3 | Package |
| 4... | Reserved |

FIG. 9

| Element or Attribute Name | Use | Description |
|---|---|---|
| EFDT | | extended FDT instance descriptor (Note that all FDT parameters are also included) |
| @route:idRef | 0..1 | Identification of the EFDT. |
| @route:version | O | Version of this extended FDT instance descriptor. The version if increased by one when the descriptor is updated. The received EFDT with highest version number is the currently valid version. |
| @route:maxExpiresDelta | O | The maximum expiry time for an object in the Transport Session after sending the first packet associated to this object. |
| @route:maxTransportSize | O | The maximum transport size of any object described by this EFDT. Shall be present if not present in FEC_OTI |
| route:FileTemplate | 0..1 | Specifies the file URL or file template in the body. For details refer to Section 6.3.2.3.2. |
| Legend: | | |

For attributes: M=Mandatory, O=Optional, OD=Optional with Default Value, CM=Conditionally Mandatory.

For elements: <minOccurs>..<maxOccurs> (N=unbounded)

Note that the conditions only holds without using xlink:href. If linking is used, then all attributes are "optional" and <minOccurs=0>

Elements are bold; attributes are non-bold and preceded with an @.

FIG. 10

| $(<Identifier>$ | Substitution parameter | Format |
|---|---|---|
| $$ | Is an escape sequence, i.e. "$$" is non-recursively replaced with a single "$" | not applicable |
| STOI$ | This identifier is substituted with the TOI. | The format tag may be present. If no format tag is present, a default format tag with width=1 shall be used. |

FIG. 18

(a)
```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| HET=[TBD] |             Transfer Length                      |
+-+-+-+-+-+-+-+-+-+-+-+-+-+-+-+-+-+-+-+-+-+-+-+-+-+-+-+-+-+-+-+-+
```

(b)
```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| HET=[TBD] |                                                   |
+-+-+-+-+-+-+
|                     Transfer Length                           |
+-+-+-+-+-+-+-+-+-+-+-+-+-+-+-+-+-+-+-+-+-+-+-+-+-+-+-+-+-+-+-+-+
```

FIG. 19

| Element or Attribute Name | | | Use | Description |
|---|---|---|---|---|
| RepairFlow | | | | defines a repair flow in session |
| | FECParameters | | | FEC Parameters (better structuring may be suitable necessary) |
| | | @fecEncodingId | M | specifies the applied FEC scheme. |
| | | @maximumDelay | O | specifies the maximum delivery delay between any source packet in the source flow and the repair flow. |
| | | @overhead | O | specifies the overhead in percentage |
| | | @minBufferSize | O | specifies the required buffer size. If present then this attribute defines the minimum buffer size that is required to handle all associated objects that are assigned to a super-object. |
| | FECOTI | | 1 | specifies the FEC Object Transmission Information (FEC OTI) as defined in RFC 5052 [8]. FEC OTI corresponds to FEC related information associated with an object as well as FEC information associated with the encoding symbols of the object is to be included within this declaration and applies to all repair packets with the repair flow. |
| | ProtectedObject | | 0..N | specifies the source flow protected by the this Repair Flow and the details on how the protection is done. |

Legend:
For attributes: M=Mandatory, O=Optional, OD=Optional with Default Value, CM=Conditionally Mandatory.
For elements: <minOccurs>...<maxOccurs> (N=unbounded)
Elements are bold, attributes are non-bold and preceded with an @

FIG. 20

| Element or Attribute Name | | Use | Description |
|---|---|---|---|
| ProtectedObject | | | |
| | @sessionDescription | O | defines how certain delivery objects of a collection of objects are included in the repair flow references the session description that contains the Source Flow. If not present, the source flow is contained in the same session as the repair flow. |
| | @tsi | M | specifies transport session identifier for the source flow to be protected. |
| | @sourceTOI | O | specifies the TOI of the delivery object corresponding to the TOI included in the repair flow. For details see Section 7.3.3. If not present, the source TOI is the same as the repair TOI. |
| | @fecTransportObjectSize | O | specifies the default size of each FEC transport object, in units of symbols. If not present then these values shall be provided in the repair packets using the EXT_TOL header. If present, the EXT_TOL header shall not be present. |
| Legend: For attributes: M=Mandatory, O=Optional, OD=Optional with Default Value, CM=Conditionally Mandatory. For elements: <minOccurs>...<maxOccurs> (N=unbounded) Elements are bold; attributes are non-bold and preceded with an @ | | | |

FIG. 21

```
<?xml version="1.0"?>
<RepairFlow xmlns:xsi="http://www.w3.org/2001/XMLSchema-instance"
    xmlns="urn:3gpp:mbms:schema:repairflow:2013"
    xsi:schemaLocation="urn:3gpp:mbms:schema:repairflow:2013 repairflow.xsd"
    tsi="10"
    sessionDescription="http://mbmsrocks.com/example-session1.sdp">
    <FECParameters fecEncodingID="6" maximumDelay="5000">
        <FECOTI>XXXYYYYZZZZ</FECOTI>
        <ProtectedObject
            tsi="1"
            sessionDescription="http://mbmsrocks.com/example-session1.xml"
            sourceTOI="TOI"
            fecTransportObjectSize ="892"/>
    </FECParameters>
</RepairFlow>
```

FIG. 22

```
<?xml version="1.0"?>
<RepairFlow xmlns:xsi="http://www.w3.org/2001/XMLSchema-instance"
    xmlns="urn:3gpp:mbms:schema:repairflow:2013"
    xsi:schemaLocation="urn:3gpp:mbms:schema:repairflow:2013 repairflow.xsd"
    tsi="11"
    sessionDescription="http://mbmsrocks.com/example-session1.sdp">
    <FECParameters fecEncodingID="6" maximumDelay="5000">
        <FECOTI>XXXYYYYZZZZ</FECOTI>
        <ProtectedObject tsi="2" fecTransportObjectSize="892"/>
        <ProtectedObject tsi="3" fecTransportObjectSize="1340"/>
    </FECParameters>
</RepairFlow>
```

FIG. 23

```
<?xml version="1.0"?>
<RepairFlow xmlns:xsi="http://www.w3.org/2001/XMLSchema-instance"
    xmlns="urn:3gpp:mbms:schema:repairflow:2013"
    xsi:schemaLocation="urn:3gpp:mbms:schema:repairflow:2013 repairflow.xsd"
    tsi="12"
    sessionDescription="http://mbmsrocks.com/example-session1.xml">
    <FECParameters fecEncodingID="6" maximumDelay="5000">
        <FECOTI>XXXYYYYZZZZ</FECOTI>
        <ProtectedObject tsi="4" sourceTOI="2*TOI"/>
        <ProtectedObject tsi="5"/>
        <ProtectedObject tsi="4" sourceTOI="2*TOI+1"/>
    </FECParameters>
</RepairFlow>
```

FIG. 24

```
<?xml version="1.0"?>
<RepairFlow xmlns:xsi="http://www.w3.org/2001/XMLSchema-instance"
    xmlns="urn:3gpp:mbms:schema:repairflow:2013"
    xsi:schemaLocation="urn:3gpp:mbms:schema:repairflow:2013 repairflow.xsd"
    tsi="13"
    sessionDescription="http://mbmsrocks.com/example-session1.xml">
    <FECParameters fecEncodingID="6" maximumDelay="5000">
        <FECOTI>XXXYYYYZZZZ</FECOTI>
        <ProtectedObject tsi="6" sourceTOI="TOI+1"/>
    </FECParameters>
</RepairFlow>
```

FIG. 25

```
<?xml version="1.0"?>
<RepairFlow xmlns:xsi="http://www.w3.org/2001/XMLSchema-instance"
    xmlns="urn:3gpp:mbms:schema:repairflow:2013"
    xsi:schemaLocation="urn:3gpp:mbms:schema:repairflow:2013 repairflow.xsd"
    tsi="14"
    sessionDescription="http://mbmsrocks.com/example-session1.sdp">
    <FECParameters fecEncodingID="6" maximumDelay="5000">
        <FECOTI>XXXYYYZZZZ</FECOTI>
        <ProtectedObject tsi="7" repairTOI="2*TOI"/>
        <ProtectedObject tsi="7" repairTOI="2*TOI+1"/>
    </FECParameters>
</RepairFlow>
```

FIG. 26

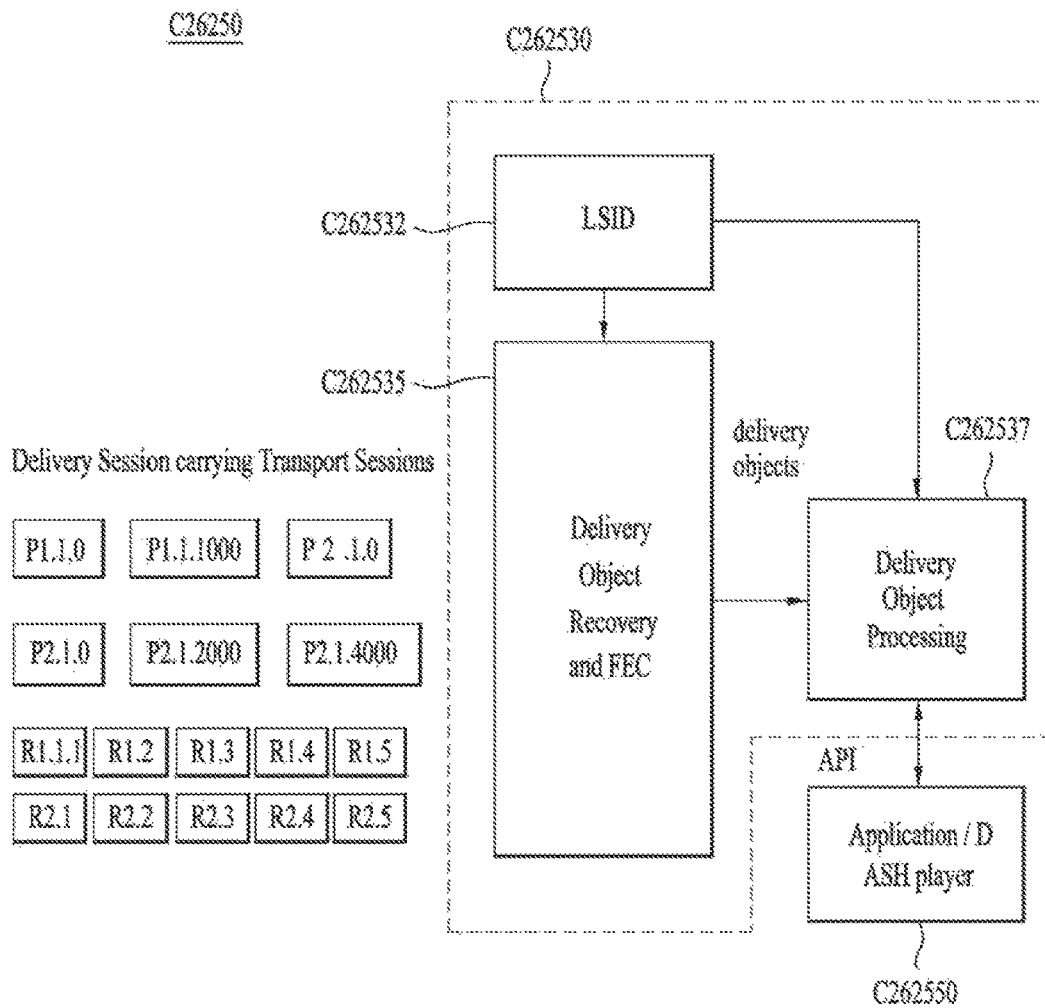

FIG. 27

```xml
<?xml version="1.0" encoding="UTF-8"?>
<MPD
 xmlns:xsi="http://www.w3.org/2001/XMLSchema-instance"
 xmlns="urn:mpeg:dash:schema:mpd:2011"
 xsi:schemaLocation="urn:mpeg:dash:schema:mpd:2011 DASH-MPD.xsd"
 type="static"
 mediaPresentationDuration="PT3256S"
 minBufferTime
 profiles="urn:mpeg:dash:profile:isoff <BaseURL>http://cdn1.example.com/</BaseURL>
 <BaseURL>http://cdn2.example.com/</BaseURL>
 <!-- In this Period the SVC stream is split into three representations -->
 <Period>
   <AdaptationSet
     subsegmentAlignment="true"
     subsegmentStartsWithSAP="2"
     minBandwidth="512000"
     maxBandwidth="1024000"
     width="640"
     height="480"
     frameRate="30"
     lang="en">
     <!-- Independent Representation -->
     <Representation
       mimeType="video/mp4"
       codecs="avc1.4D401E,mp4a.40"
       id="tag5"
       bandwidth="512000">
       <BaseURL>video-512k.mp4</BaseURL>
       <SegmentBase indexRange="0-4332"/>
     </Representation>
     <!-- Representation dependent on above -->
     <Representation
       mimeType="video/mp4"
       codecs="avc2.56401E"
       id="tag6"
       dependencyId="tag5"
       bandwidth="768000">
       <BaseURL>video-768k.mp4</BaseURL>
       <SegmentBase indexRange="0-3752"/>
     </Representation>
     <!-- Representation dependent on both above -->
     <Representation
       mimeType="video/mp4"
       codecs="avc2.56401E "
       id="tag7"
       dependencyId="tag5 tag6"
       bandwidth="1024000">
       <BaseURL>video-1024k.mp4</BaseURL>
       <SegmentBase indexRange="0-3752"/>
     </Representation>
   </AdaptationSet>
 </Period>
</MPD>
```

FIG. 28

| $<Identifier>$ | Substitution parameter |
|---|---|
| $first$ | The identifier shall be substituted by the byte offset of the first byte in a range and shall be identical to the value of 'first-byte-pos' of 'byte-range-spec' in 14.35.1 of RFC 2616 [3], if this request would be executed using a partial GET request. |
| $last$ | The identifier is substituted by the byte offset of the last byte in the range; that is, the byte positions specified are inclusive. It shall be identical to the value of 'last-byte-pos' of 'byte-range-spec' in 14.35.1 of RFC 2616 [3], if this request would be executed using a partial GET request. |

FIG. 29

| URL to full object | http://cdn.example.com/movies/134532/audio/en/aac64.mp4 |
|---|---|
| Byte Range of delivery object | 1876-23456 |
| URL to delivery object | http://cdn.example.com/movies/134532/audio/en/aac64.mp4?range=1876-23456 |

| Key | Value | Semantics |
|---|---|---|
| fragment | integer | Value of movie fragment in the ISO BMFF (movie fragment number). If 0 it points to the movie header. |
| subsegment | integer | Value of a Subsegment in a ISO BMFF / DASH Representation. If 0 it points to the movie header and the Segment index |

APPARATUS AND METHOD FOR TRANSMITTING/RECEIVING PROCESSES OF A BROADCAST SIGNAL

CROSS-REFERENCE TO RELATED APPLICATIONS

This Application is a Continuation of co-pending U.S. patent application Ser. No. 14/909,396 filed on Feb. 1, 2016, which is the National Phase of PCT International Application No. PCT/KR2015/007871 filed on Jul. 28, 2015, which claims the benefit under 35 U.S.C. § 119(e) to U.S. Provisional Application No. 62/031,857 filed on Jul. 31, 2014, all of which are hereby expressly incorporated by reference into the present application.

BACKGROUND OF THE INVENTION

Field of the Invention

The present invention relates to a method and apparatus for transmitting/receiving a media signal. More particularly, the present invention relates to a method and apparatus for processing media data transmitted through each of broadband and broadcast in a broadcast system in which broadband and broadcast are combined.

Discussion of the Related Art

With termination of analog broadcast signal transmission, various technologies for transmitting and receiving a digital broadcast signal have been developed. The digital broadcast signal may include a greater amount of video/audio data when compared to an analog broadcast signal, and further include various types of additional data in addition to the video/audio data.

SUMMARY OF THE INVENTION

An object of the present invention devised to solve the problem that lies in providing an appropriate method and apparatus for processing data in a hybrid broadcast system in which a scheme of transmitting data through a conventional broadcast network and a scheme of transmitting data through a broadband network interoperate.

The objects of the present invention can be achieved by providing a broadcast transmission apparatus comprising a delivery object generator configured to generate at least one Delivery Object which is included in a content component of a service and recovered individually, a signaling information generator configured to generate signaling information providing discovery and acquisition of the service and the content component; and a transmitter configured to transmit the at least one Delivery Object and the signaling information through an unidirectional channel.

Preferably, the Delivery Object is one of a file, a part of the file, a group of the file, Hyper Text Transfer Protocol (HTTP) Entity, and a group of the HTTP Entity.

Preferably, the signaling information comprises first information describing a transport session transmitting the content component of the service.

Preferably, the first information comprises second information describing source data transmitted in the transport session.

Preferably, the second information comprises at least one of an EFDT element specifying details of the file delivery data, an idRef attribute identifying the EFDT element, a realtime attribute indicating whether or not the Delivery Objects are delivered in realtime, a minBufferSize attribute defining a maximum amount of data that needs to be stored in a receiver, an ApplicationIdentifier element providing information that can be mapped to an application, and/or a PayloadFormat element defining payload formats of packets carrying the Delivery Object.

Preferably, the PayloadFormat element comprises at least one of a codePoint attribute defining what CodePoint value is used for a payload, a deliveryObjectFormat attribute specifying the payload format of the delivery object, a fragmentation attribute indicating an unit of the Delivery Object, a deliveryOrder attribute indicating a delivery order of packets containing data of the Delivery Object, a sourceFecPayloadID attribute defining a format of a Source FEC Payload ID, and a FECParameters element defining FEC parameters.

Preferably, the EFDT element comprises at least one of an idRef attribute identifying the EFDT element, a version attribute indicating a version of the EFDT element, a maxExpiresDelta attribute indicating a maximum expiry time for an object in the Transport Session, a maxTransportSize attribute indicating a maximum transport size of object described by the EFDT element, and a FileTemplate element specifying a file URL.

The objects of the present invention can be achieved by providing a broadcast reception apparatus comprising a broadcast interface configured to receive a broadcast signal comprising a service through an unidirectional channel; a signaling parser configured to extract signaling information providing discovery and acquisition of the service and a content component of the service; and a delivery object processor configured to recover at least one Delivery Object based on the signaling information.

Preferably, the Delivery Object is one of a file, a part of the file, a group of the file, Hyper Text Transfer Protocol (HTTP) Entity, and a group of the HTTP Entity.

Preferably, the signaling information comprises first information describing a transport session transmitting the content component of the service.

Preferably, the first information comprises second information describing source data transmitted in the transport session.

Preferably, the second information comprises at least one of an EFDT element specifying details of the file delivery data, an idRef attribute identifying the EFDT element, a realtime attribute indicating whether or not the delivery objects are delivered in realtime, a minBufferSize attribute defining a maximum amount of data that needs to be stored in a receiver, an ApplicationIdentifier element providing information that can be mapped to an application, and/or a PayloadFormat element defining payload formats of packets carrying the delivery object.

Preferably, the PayloadFormat element comprises at least one of a codePoint attribute defining what CodePoint value is used for a payload, a deliveryObjectFormat attribute specifying the payload format of the delivery object, a fragmentation attribute indicating an unit of the delivery object, a deliveryOrder attribute indicating a delivery order of packets containing data of the delivery object, a sourceFecPayloadID attribute defining a format of a Source FEC Payload ID, and a FECParamenters element defining FEC parameters.

Preferably, the EFDT element comprises at least one of an idRef attribute identifying the EFDT element, a version attribute indicating a version of the EFDT element, a maxExpiresDelta attribute indicating a maximum expiry time for an object in the Transport Session, a maxTransportSize attribute indicating a maximum transport size of object described by the EFDT element, and a FileTemplate element specifying a file URL.

A broadcast signal transmission apparatus according to an embodiment of the present invention is effective in reducing a transmission standby time taken to transmit multimedia content.

In addition, a broadcast signal reception apparatus according to an embodiment of the present invention is effective in reducing a reproduction standby time taken to reproduce multimedia content.

In addition, the present invention is effective in reducing a total time taken from acquisition of multimedia content until the multimedia content is displayed to a user.

In addition, the present invention is effective in reducing an initial delay time when the user accesses a broadcast channel.

In addition, according to an embodiment of the present invention, it is possible to transmit and/or receive MPEG-DASH media segment files in real time.

BRIEF DESCRIPTION OF THE DRAWINGS

FIG. 5 is a diagram illustrating a layered coding transport session instance description (LSID) according to an embodiment of the present invention;

FIG. 6 is a diagram illustrating a SourceFlow Element according to an embodiment of the present invention;

FIG. 9 is a diagram illustrating an extended file delivery table (EFDT) according to an embodiment of the present invention;

FIG. 10 is a diagram illustrating identifiers for file templates according to an embodiment of the present invention;

FIG. 18 is a diagram illustrating an EXT_TOL header according to an embodiment of the present invention;

FIG. 19 is a diagram illustrating a RepairFlow element according to an embodiment of the present invention;

FIG. 20 is a diagram illustrating a ProtectedObject element according to an embodiment of the present invention;

FIG. 21 is a diagram illustrating RepairFlow declaration according to an embodiment of the present invention;

FIG. 22 is a diagram illustrating RepairFlow declaration according to an embodiment of the present invention;

FIG. 23 is a diagram illustrating RepairFlow declaration according to an embodiment of the present invention;

FIG. 24 is a diagram illustrating RepairFlow declaration according to an embodiment of the present invention;

FIG. 25 is a diagram illustrating RepairFlow declaration according to an embodiment of the present invention;

FIG. 26 is a block diagram illustrating a broadcast reception apparatus according to an embodiment of the present invention;

FIG. 27 is a diagram illustrating an MPD according to an embodiment of the present invention;

FIG. 28 is a diagram illustrating a URI form according to an embodiment of the present invention;

FIG. 29 is a diagram illustrating a URI form according to an embodiment of the present invention;

DETAILED DESCRIPTION OF THE EMBODIMENTS

Hereinafter, although the preferred embodiments of the present invention will be described in detail with reference to the accompanying drawings and descriptions of the drawings, the present invention is not restricted or limited by the embodiments.

Although the terms used in the following description are selected, as much as possible, from general terms that are widely used at present while taking into consideration of the functions obtained in accordance with the present invention, these terms may be replaced by other terms based on intentions of those skilled in the art, customs, emergence of new technologies, or the like. In addition, in a particular case, terms that are arbitrarily selected by the applicant of the present invention may be used. In this case, the meanings of these terms will be described in corresponding description parts of the invention. Accordingly, it should be noted that the terms used herein should be construed based on practical meanings thereof and the whole content of this specification, rather than being simply construed based on names of the terms.

In the present specification, the term "signaling" indicates transmission/reception of service information (SI) provided in a broadcast system, an Internet broadcast system and/or a broadcast/Internet integrated system. The service information includes broadcast service information (for example, ATSC-SI and/or DVB-SI) provided in each of currently existing broadcast systems.

In the present specification, the term "broadcast signal" is defined as a concept including a signal and/or data provided by bi-directional broadcasting such as Internet broadcasting, broadband broadcasting, communication broadcasting, data broadcasting, video on demand (VOD), etc. in addition to terrestrial broadcasting, cable broadcasting, satellite broadcasting, and/or mobile broadcasting.

In the present specification, the term "physical layer pipe (PLP)" refers to a certain unit for transmitting data included in a physical layer. Therefore, in the present specification, content referred to as a "PLP" may be referred to as a "data unit" or a "data pipe" instead.

A hybrid broadcast service using a linkage between a broadcast network and an Internet protocol network may be one of prime applications to be used in a digital television (DTV) service. The hybrid broadcast service enables a user to experience various content by transmitting, through the Internet protocol network, enhancement data related to audio/video (A/V) content which is transmitted through a terrestrial broadcast network or a part of the A/V content in real time.

Figure 1:
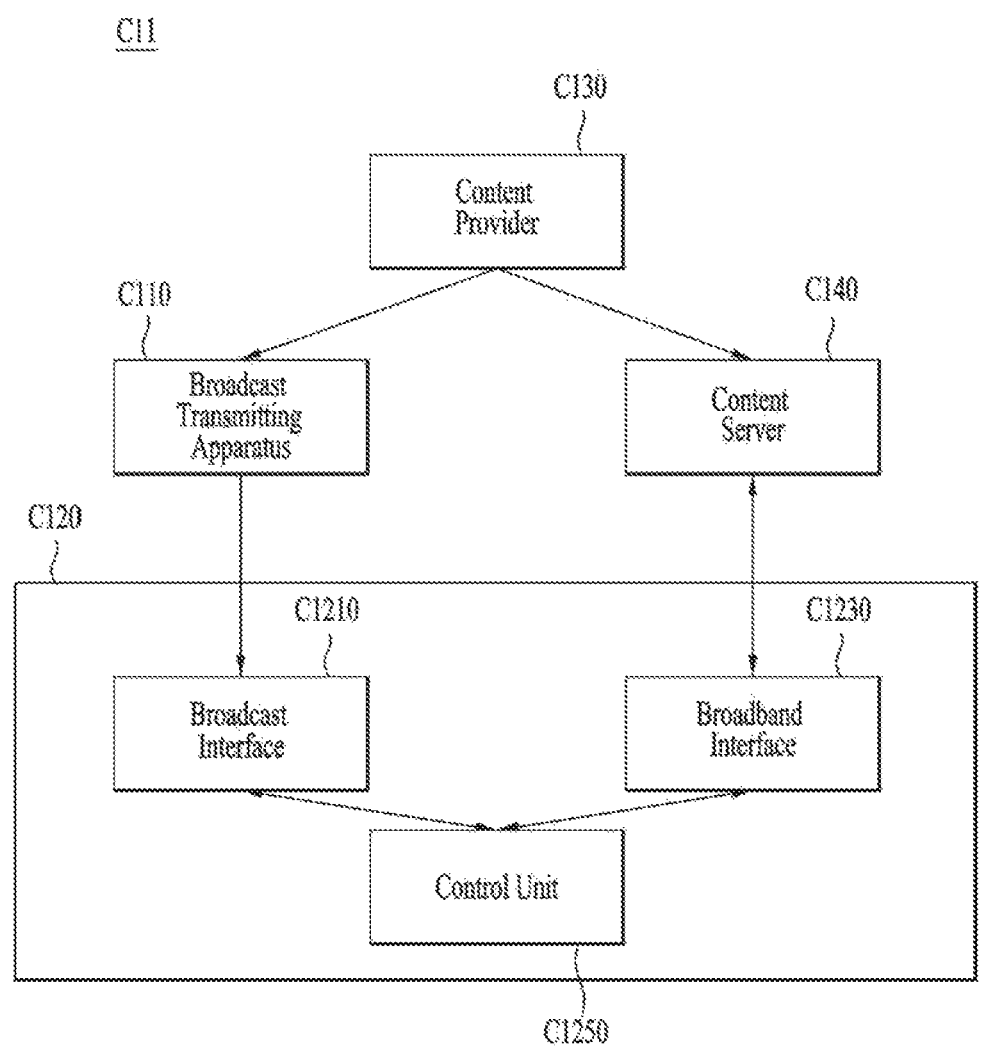
FIG. 1 is a block diagram illustrating a broadcast system according to an embodiment of the present invention.

FIG. 1 illustrates a broadcast system C11 according to an embodiment of the present invention.

Referring to the figure, the broadcast system C11 according to the present embodiment may include at least one of a broadcast transmission apparatus C110, a broadcast reception apparatus C120, a content provider C130, and/or a content server C140.

The content provider C130 may provide a broadcast service to the broadcast transmission apparatus C110 and the content server C140.

The broadcast transmission apparatus C110 may transmit a broadcast signal including the broadcast service using at least one of a satellite, a ground wave, and/or a cable broadcast network. The broadcast transmission apparatus C110 may include a controller (not illustrated) and a transmitter (not illustrated). The controller may control an operation of the broadcast transmission apparatus C110. For example, the broadcast transmission apparatus C110 may further include the content provider C130 and/or the content server C140.

The content server C140 may transmit the broadcast service based on a request from the broadcast reception apparatus C120.

The broadcast reception apparatus C120 may receive the broadcast service using at least one of a broadcast network (for example, broadcast) and/or an Internet protocol network (for example, broadband Internet). The broadcast reception apparatus C120 may include at least one of a broadcast interface C1210, a broadband interface C1230, and/or a control unit C1250.

The broadcast reception apparatus C120 may receive the broadcast signal including the broadcast service using the broadcast interface C1210. In this instance, the broadcast signal may be transmitted using at least one of the satellite, the ground wave, and/or the cable broadcast network. Therefore, the broadcast interface C1210 may include at least one of a satellite tuner, a ground wave tuner, and/or a cable tuner to receive the broadcast signal.

The broadcast reception apparatus C120 may request that the content server C140 provide the broadcast service using the broadband interface C1230. The broadcast reception apparatus C120 may receive the broadcast service from the content server C140 using the broadband interface C1230.

The broadcast reception apparatus C120 may decode the broadcast service using a decoder (not illustrated).

The broadcast reception apparatus C120 may control at least one of the broadcast interface C1210, the broadband interface C1230, and/or the decoder using the control unit C1250.

Figure 2:
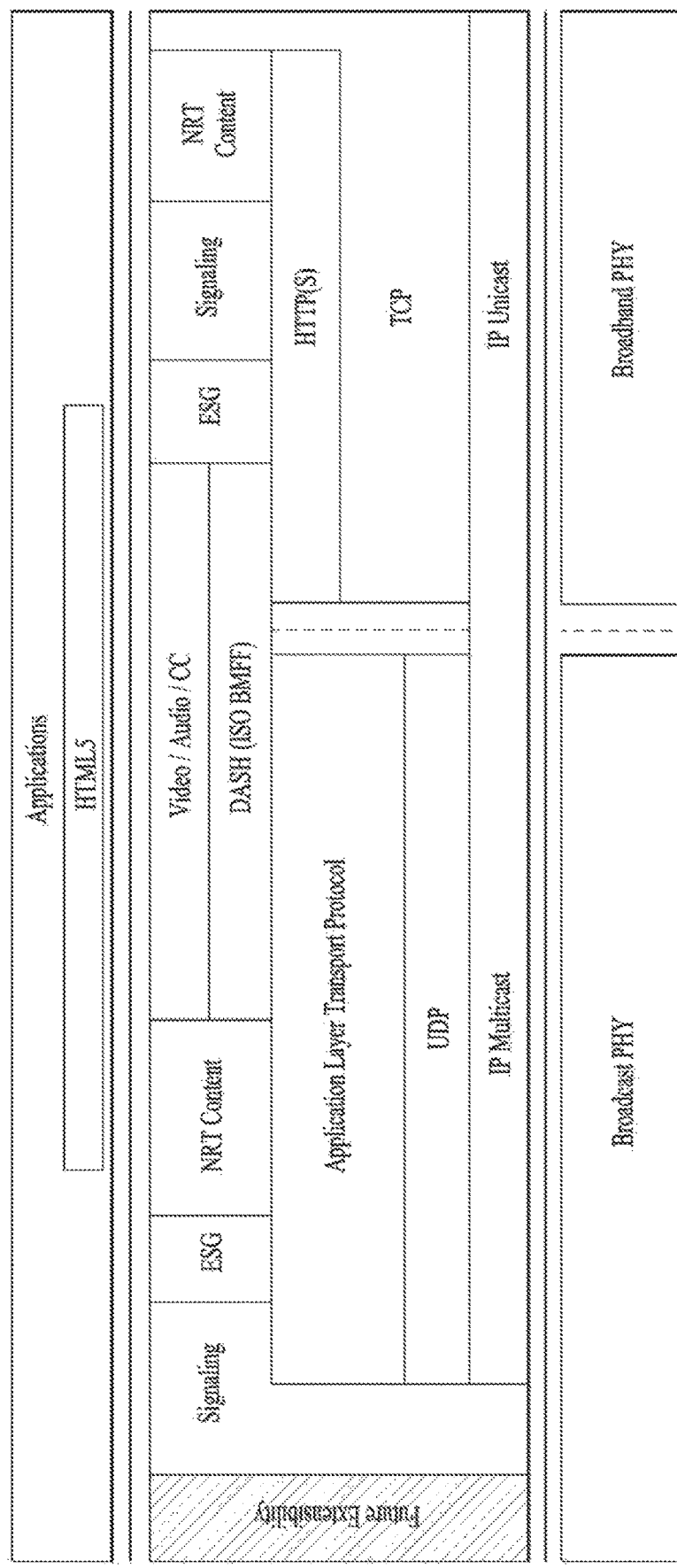
FIG. 2 is a diagram illustrating a ROUTE protocol stack according to an embodiment of the present invention.

FIG. 2 illustrates a ROUTE protocol stack according to an embodiment of the present invention.

The broadcast transmission apparatus according to the present embodiment may transmit the broadcast service based on the ROUTE protocol stack.

The broadcast service according to the present embodiment may include additional services such as an HTML5 application, an interactive service, an ACR service, a second screen service, a personalization service, etc. in addition to media data (for example, video data, audio data, and closed caption data).

For example, a broadcast service of a next generation broadcast system that supports Internet protocol (IP) based hybrid broadcasting may include real-time content data, signaling data, electronic service guide (ESG) data, and/or non-real-time (NRT) content data.

The broadcast service may be transmitted through the broadcast network (broadcast) such as the ground wave, the cable, the satellite, etc. In addition, the broadcast service according to the present embodiment may be transmitted through the Internet protocol network (broadband).

First, a description will be given of a method of transmitting the broadcast service through the broadcast network.

Media data may include video data, audio data, and/or caption data. The media data may be encapsulated in a segment of moving picture expert group (MPEG)-dynamic adaptive streaming over hypertext transfer protocol (HTTP) (DASH) and/or a media processing unit (MPU) of MPEG media transport (MMT). For example, a file format of the segment of MPEG-DASH and/or the MPU of MMT may be an ISO base media file (hereinafter referred to as ISO BMFF).

The signaling data, the ESG data, the NRT content data, and/or the real-time content data may be encapsulated in an application layer transport protocol packet that supports real-time transmission. For example, the real-time content data may include the media data such as the video data, the audio data, and/or the caption data. In addition, the NRT content data may include media data and/or an application. In addition, an application layer transport protocol may include real-time object delivery over unidirectional transport (ROUTE) and/or MMT. The application layer transport protocol packet may include a ROUTE packet and/or an MMT packet. Hereinafter, the application layer transport protocol packet may be simply expressed by a packet.

Then, data encapsulated in the application layer transport protocol packet may be encapsulated in a user datagram protocol (UDP) datagram.

Then, the UDP datagram may be encapsulated in an IP datagram. For example, the IP datagram may be a datagram based on an IP multicast or IP unicast scheme.

Then, the IP datagram may be transmitted over the broadcast signal. For example, the IP datagram may be transmitted through a physical layer (broadcast PHY).

The signaling data according to the present embodiment may be transmitted through a particular PLP of a transport frame (or frame) delivered to a physical layer of the broadcast network and a next generation broadcast transmission system according to an attribute of signaling. For example, a signal may have a form encapsulated in a bit stream or an IP datagram.

Next, a description will be given of a method of transmitting the broadcast service through the Internet protocol network.

The signaling data, the ESG data, the NRT content data, and/or the real-time content data may be encapsulated in an HTTP packet.

Then, the data encapsulated in the HTTP packet may be encapsulated in a transmission control protocol (TCP)

packet. The broadcast service according to the present embodiment may be directly encapsulated in the TCP packet.

Then, the TCP packet may be encapsulated in an IP datagram. For example, the IP datagram may be a datagram based on the IP multicast or IP unicast scheme.

Then, the IP datagram may be transmitted over a broadcast signal. For example, the IP datagram may be transmitted through a physical layer (broadband PHY).

In the Internet protocol network, the signaling data, the ESG data, the NRT content data, and/or the real-time content data may be delivered in response to a request from a receiver.

The broadcast reception apparatus may receive the broadcast service based on the above-described ROUTE protocol stack.

Hereinafter, a description will be given focusing on a case in which the signaling data, the ESG data, the NRT content data, and/or the real-time content data described above are encapsulated in transport packets of ROUTE.

Real-Time Object Delivery over Unidirectional Transport (ROUTE) is a protocol for the delivery of files over IP multicast networks. ROUTE protocol utilizes Asynchronous Layered Coding (ALC), the base protocol designed for massively scalable multicast distribution, Layered Coding Transport (LCT), and other well-known Internet standards. ROUTE is an enhancement of and functional replacement for FLUTE with additional features.

Figure shows ROUTE in the context of a receiver protocol stack for hybrid (broadcast/broadband) delivery of real-time and non-real-time content. As shown, ROUTE functions to deliver signaling messages, Electronic Service Guide (ESG) messages, and NRT content. It is particularly well suited to the delivery of streaming media for example MPEG-DASH Media Segment files. ROUTE offers lower end-to-end latency through the delivery chain as compared to FLUTE.

The ROUTE protocol is a generic transport application, providing for the delivery of any kind of object. It supports rich presentation including scene descriptions, media objects, and DRM-related information. ROUTE is particularly well suited to the delivery of real-time media content and offers many features.

For example, ROUTE offers individual delivery and access to different media components, e.g. language tracks, subtitles, alternative video views. And, ROUTE offers support of layered coding by enabling the delivery on different transport sessions or even ROUTE sessions. And, ROUTE offers support for flexible FEC protection, including multistage. And, ROUTE offers easy combination with MPEG-DASH enabling synergy between broadcast and broadband delivery modes of DASH. And, ROUTE offers fast access to media when joining a ROUTE and/or transport session. And, ROUTE offers high extensibility by focusing on the delivery concept. And, ROUTE offers compatibility with existing IETF protocols and use of IETF-endorsed extension mechanisms.

The ROUTE protocol is split in two major components. First component is a source protocol for delivery of objects or flows/collection of objects. Second component is a repair protocol for flexibly protecting delivery objects or bundles of delivery objects that are delivered through the source protocol.

The source protocol is independent of the repair protocol, i.e. the source protocol may be deployed without the ROUTE repair protocol. Repair may be added only for certain deployment scenarios, for example only for mobile reception, only in certain geographical areas, only for certain service, etc.

The source protocol is aligned with FLUTE as defined in RFC 6726 as well as the extensions defined in 3GPP TS 26.346, but also makes use of some principles of FCAST as defined in RFC 6968, for example, that the object metadata and the object content may be sent together in a compound object.

In addition to basic FLUTE protocol, certain optimizations and restrictions are added that enable optimized support for real-time delivery of media data; hence, the name of the protocol. Among others, the source ROUTE protocol provides a real-time delivery of object-based media data. And, the source ROUTE protocol provides a flexible packetization, including enabling media-aware packetization as well as transport-aware packetization of delivery objects. And, the source ROUTE protocol provides an independence of files and delivery objects, i.e. a delivery object may be a part of a file or may be a group of files.

ROUTE repair protocol is FEC based and enabled as an additional layer between the transport layer (e.g., UDP) and the object delivery layer protocol. The FEC reuses concepts of FEC Framework defined in RFC 6363, but in contrast to the FEC Framework in RFC 6363 the ROUTE repair protocol does not protect packets, but instead it protects delivery objects as delivered in the source protocol. Each FEC source block may consist of parts of a delivery object, as a single delivery object (similar to FLUTE) or by multiple delivery objects that are bundled prior to FEC protection. ROUTE FEC makes use of FEC schemes in a similar sense to that defined in RFC 5052, and uses the terminology of that document. The FEC scheme defines the FEC encoding and decoding, and it defines the protocol fields and procedures used to identify packet payload data in the context of the FEC scheme.

In ROUTE all packets are LCT packets as defined in RFC 5651. Source and repair packets may be distinguished by different ROUTE sessions. i.e. Different ROUTE sessions are carried on different IP/UDP port combinations. And, Source and repair packets may be distinguished by different LCT transport sessions. i.e. Different LCT transport sessions use different TSI values in the LCT header. And, Source and repair packets may be distinguished by a PSI bit in the LCT, if carried in the same LCT transport session. This mode of operation is mostly suitable for FLUTE compatible deployments.

ROUTE defines the source protocol including packet formats, sending behavior, and/or receiving behavior. And, ROUTE defines the repair protocol. And, ROUTE defines a metadata for transport session establishment and a metadata for object flow delivery. And ROUTE defines recommendations for MPEG DASH configuration and mapping to ROUTE to enable rich and high-quality linear TV broadcast services.

Figure 3:
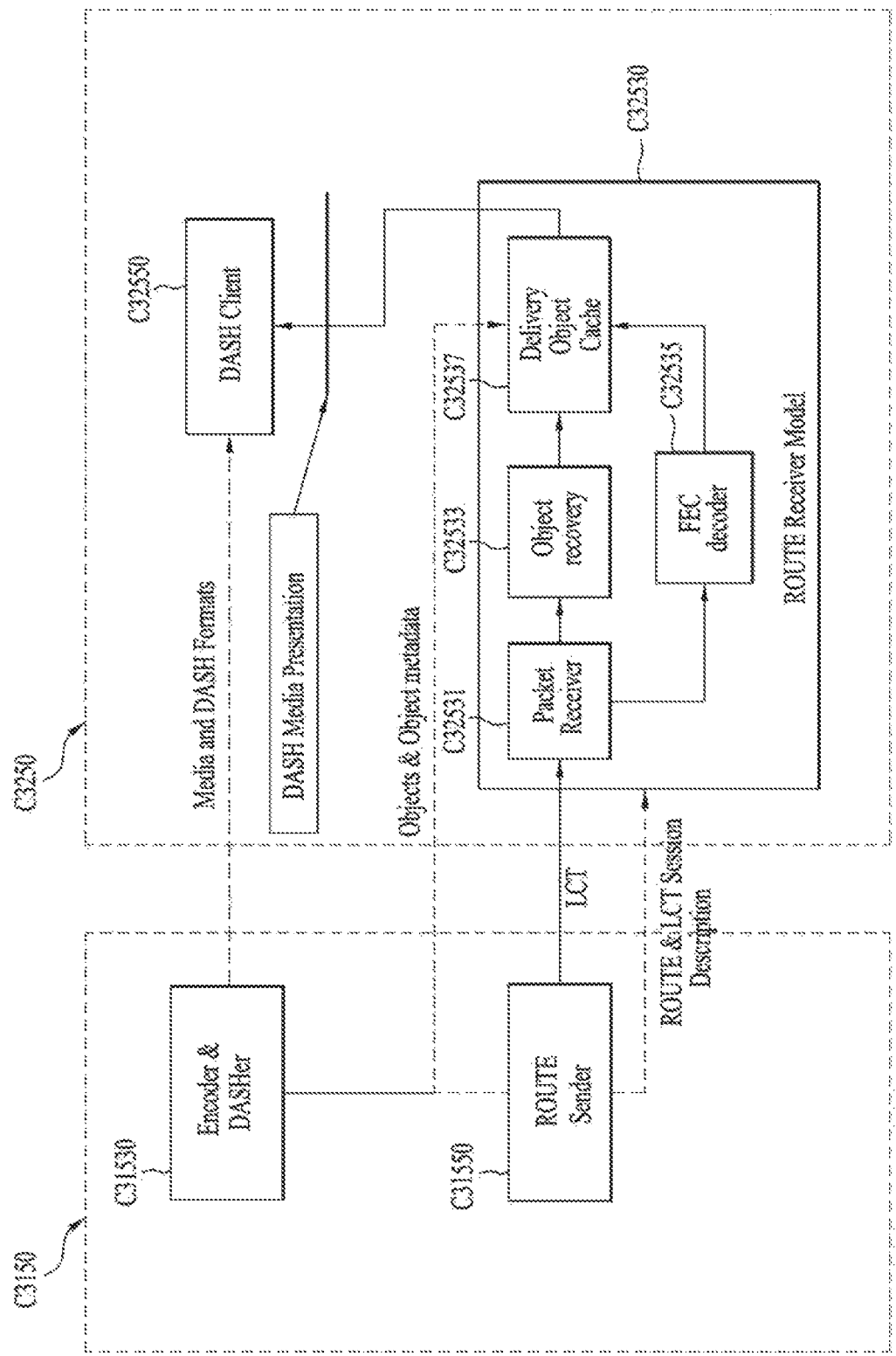
FIG. 3 is a diagram illustrating a broadcast system according to an embodiment of the present invention.

FIG. 3 illustrates a broadcast system according to an embodiment of the present invention.

The broadcast system according to the present embodiment may include at least one of the broadcast transmission apparatus and/or the broadcast reception apparatus. The broadcast transmission apparatus may include at least one of a controller C3150 and a transmitter (not illustrated). The broadcast reception apparatus may include at least one of a broadcast interface (not illustrated), a broadband interface (not illustrated), and/or a controller C3250. A basic description of the broadcast system according to the present embodiment is similar to the above description.

The broadcast transmission apparatus may deliver the broadcast service to the broadcast reception apparatus. For example, the broadcast transmission apparatus may deliver data of media and/or DASH formats to the broadcast reception apparatus.

The controller C3150 of the broadcast transmission apparatus may include at least one of an encoder & DASHer C31530 and/or a ROUTE sender C31550.

The encoder & DASHer C31530 may encode the broadcast service, and encapsulate the encoded broadcast service in at least one segment of MPEG-DASH.

For example, the encoder & DASHer C31530 may encode at least one of signaling data, ESG data, NRT content data, and real-time content data, and encapsulate the encoded data in at least one segment of MPEG-DASH. A file format of the segment of MPEG-DASH may be an ISO BMFF.

The ROUTE sender C31550 may generate signaling information and/or at least one delivery object (or object) based on the at least one segment.

The signaling information may include discovery and/or description information of the broadcast service. For example, the signaling information may include link layer signaling information and/or service layer signaling information. In addition, the signaling information may include ROUTE session description, LCT transport session description (or LCT session description), and/or delivery object metadata (or object metadata). The ROUTE session description may include signaling information related to a ROUTE session. The LCT transport session description may include signaling information related to an LCT transport session. The delivery object metadata may include signaling information related to a delivery object.

The delivery object may include data related to a segment. For example, the delivery object may include a part and/or a whole of data included in the segment.

The ROUTE sender C31550 may packetize the signaling information and/or the at least one delivery object in a packet. For example, the packet may include an LCT packet.

Then, the broadcast transmission apparatus may transmit the packet including the signaling information and/or the at least one delivery object using the ROUTE sender C31550 and/or the transmitter (not illustrated).

The broadcast reception apparatus may receive the broadcast service and decode the broadcast service. For example, the broadcast reception apparatus may receive the broadcast signal including the broadcast service using the broadcast interface and/or the broadband interface. The broadcast reception apparatus may decode the broadcast service using the controller C3250. The controller C3250 of the broadcast reception apparatus may include at least one of a ROUTE receiver C32530 and/or a DASH client C32550.

The ROUTE receiver C32530 may receive the broadcast service and restore the signaling information and/or the at least one delivery object. The ROUTE receiver C32530 may restore the signaling information and/or the at least one delivery object based on the packet including the broadcast service. The signaling information may include at least one of physical layer signaling information, link layer signaling information, service layer signaling information, delivery object metadata, and/or timing information. For example, the signaling information may include ROUTE session description, LCT transport session description, and/or delivery object metadata. The delivery object may include at least one of a delivery object related to a source protocol and/or a delivery object related to a repair protocol. The ROUTE receiver C32530 may include at least one of a packet receiver C32531, an object recovery block C32533, an FEC decoder C32535, and/or a delivery object cache C32537.

The packet receiver C32531 may receive at least one packet including the broadcast service. For example, the packet may include an LCT packet.

The object recovery block C32533 may restore at least one delivery object and/or signaling information related to the source protocol based on the at least one packet including the broadcast service.

The FEC decoder C32535 may restore at least one delivery object and/or signaling information related to the repair protocol based on the at least one packet including the broadcast service.

The delivery object cache C32537 may store the signaling information and/or the at least one delivery object, and deliver the signaling information and/or the at least one delivery object to the DASH client C32550. The delivery object cache C32537 may deliver the signaling information and/or the at least one delivery object to the DASH client C32550 based on timing information.

For example, the timing information may include at least one of synchronization information, a program clock reference (PCR) that indicates a reference time for one channel program, a decoding time stamp (DTS) that indicates a decoding time, and/or a presentation time stamp (PTS) that indicates a reproduction time.

The DASH client C32550 may decode the at least one delivery object based on the signaling information. For example, the DASH client C32550 may decode the at least one delivery object based on DASH media presentation and/or the timing information.

The scope of the ROUTE protocol is the reliable delivery of delivery objects and associated metadata using LCT packets. The objects are made available to the application through a Delivery Object Cache. The implementation of this cache is application dependent.

The ROUTE protocol focuses on the format of the LCT packets to deliver the delivery objects. And, the ROUTE protocol focuses on the reliable delivery of the delivery object using a repair protocol based on FEC. And, the ROUTE protocol focuses on the definition and delivery of object metadata along with the delivery objects to enable the interface between the delivery object cache and the application. And, the ROUTE protocol focuses on the ROUTE and LCT session description to establish the reception of objects along with their metadata. And, the ROUTE protocol focuses on the normative aspects (formats, semantics) of auxiliary information to be delivered along with the packets to optimize the performance for specific applications, e.g., real-time delivery.

In addition, the ROUTE protocol provides recommended mappings of specific DASH Media Presentation formats to ROUTE delivery as well as suitable DASH formats to be used for the delivery. The key issue is that by using ROUTE, the DASH media formats may be used as is. This architectural design enables converged unicast/broadcast services.

Figure 4:
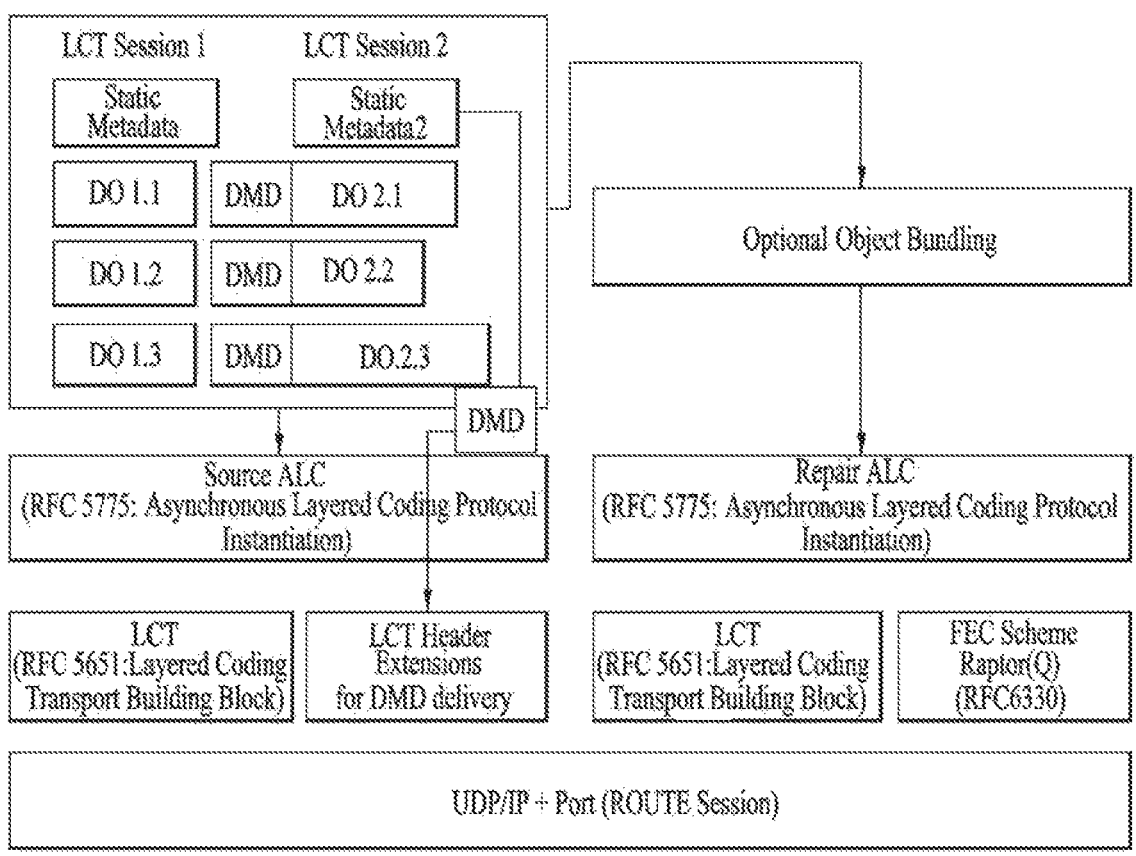
FIG. 4 is a diagram illustrating an operation of a broadcast transmission apparatus of a ROUTE Protocol according to an embodiment of the present invention.

FIG. 4 illustrates an operation of the broadcast transmission apparatus of the ROUTE protocol according to an embodiment of the present invention.

Figure shows the basic sender concept. A ROUTE session is established that delivers LCT packets. These packets may carry source objects or FEC repair data. From a top down approach, a source protocol consists of one or more LCT sessions, each carrying associated objects along with their metadata. The metadata may be statically delivered in the LCT Session Instance Description (LSID) or may be dynamically delivered, either as a compound object in the Entity Mode or as LCT extension headers in packet headers. The packets are carried in ALC using a specific FEC scheme that permits flexible fragmentation of the object at arbitrary byte boundaries. In addition, delivery objects may be FEC protected, either individually or in bundles. In either case, the bundled object is encoded and only the repair packets are delivered. In combination with the source packets, this permits the recovery delivery object bundles. Note that one or multiple repair flows may be generated, each with different characteristics, for example to supported different latency requirements, different protection requirements, etc.

A DMD (Dynamic MetaData) is metadata to generate FDT equivalent descriptions dynamically at the client. It is carried in the entity-header in the Entity Mode and is carried in the LCT header in other modes of delivery.

the ROUTE protocol supports different protection and delivery schemes of the source data. It also supports all existing use cases for NRT delivery, as it can be deployed in a backward-compatible mode.

In case of real-time delivery, the delivery objects and possibly associated FEC need to be delivered such that the delivery objects are available to the application when they are due.

Only Source Protocol can be delivered. The ROUTE protocol may be used for real-time delivery. In this case the @realtime flag in the LSID shall be set to true.

If the @realtime flag is set to true, the following shall hold. All objects shall be delivered such that the last packet is available prior to an application specific deadline. More details are provided by the application. For all random access points the EXT_PRESENTATION_TIME header shall be provided. The @minBufferSize may provide the minimum required size in kByte in order to store all packets between their reception and their presentation time. The EFDT in the LSID shall be either embedded or be provided as a reference.

Repair Protocol can be delivered. If FEC is included and @minBufferTime of the repair flow declaration is present, then @minBufferTime conveys the minimum buffer time for the repair flow.

With reference to Security Considerations, it is related to ALC as defined in RFC 5775.

With reference to regular NRT Content Delivery, regular file delivery may be done with FLUTE or ROUTE. Metadata delivery may be done with FLUTE or ROUTE.

FIG. 5 illustrates an LSID according to an embodiment of the present invention.

The ROUTE session is associated to an IP address/port combination. Typically, by joining such a session, all packets of the session can be received and the application protocol may apply further processing.

Each ROUTE session constitutes of one or multiple LCT transport sessions. LCT transport sessions are a subset of a ROUTE session. For media delivery, an LCT transport session typically would carry a media component, for example a DASH Representation. From the perspective of broadcast DASH, the ROUTE session can be considered as the multiplex of LCT transport sessions that carry constituent media components of one or more DASH Media Presentations. Within each LCT transport session, one or multiple objects are carried, typically objects that are related, e.g. DASH Segments associated to one Representation. Along with each object, metadata properties are delivered such that the objects can be used in applications. Applications include, but are not limited to, DASH Media Presentations, HTML-5 Presentations, or any other object-consuming application.

The ROUTE sessions may be bounded or unbounded from the temporal perspective. The ROUTE session contains one or multiple LCT transport sessions. Each transport session is uniquely identified by a unique Transport Session Identifier (TSI) value in the LCT header.

Before a receiver can join a ROUTE session, the receiver needs to obtain a ROUTE Session Description. The ROUTE Session Description contains at least one of the sender IP address, the address and port number used for the session, the indication that the session is a ROUTE session and that all packets are LCT packets, and/or other information that is essential to join and consume the session on an IP/UDP level.

The Session Description could also include, but is not limited to, the data rates used for the ROUTE session and any information on the duration of the ROUTE session.

The Session Description could be in a form such as the Session Description Protocol (SDP) as defined in RFC 4566 or XML metadata as defined in RFC 3023. It might be carried in any session announcement protocol using a proprietary session control protocol, located on a web page with scheduling information, or conveyed via email or other out-of-band methods.

The transport sessions are not described in the ROUTE session description, but in the LCT Session Instance Description (LSID). The transport sessions (i.e., LCT transport sessions or simply LCT sessions) may contain either or both of Source Flows and Repair Flows. The Source Flows carry source data. And, the Repair Flows carry repair data.

The LCT transport sessions contained in a ROUTE session are described by the LCT Session Instance description (LSID). Specifically, it defines what is carried in each constituent LCT transport session of the ROUTE session. Each transport session is uniquely identified by a Transport Session Identifier (TSI) in the LCT header.

The LSID describes all transport sessions that are carried on this ROUTE session. The LSID may be delivered in the same ROUTE session containing the LCT transport sessions or it may be delivered by means outside the ROUTE session, e.g. through unicast or through a different ROUTE session. In the former case, the LSID shall be delivered on a dedicated LCT transport session with TSI=0, and furthermore, it shall be a delivery object identified by TOI=0. For any object delivered on TSI=0, the Entity Mode should be used. If those objects are not delivered in the Entity Mode, then the LSID must be recovered prior to obtaining the extended FDT for the received object.

The Internet Media Type of the LSID is application/xml+route+lsid.

The LSID may reference other data fragments. Any object that is referenced in the LSID may also be delivered on TSI=0, but with a different value of TOI than the LSID itself, or it may be delivered on a separate LCT session with dedicated TSI≠0.

Figure shows the LSID element. The LSID element may contain version attribute, validity attribute, and/or expiration attribute. The LSID element may be updated accordingly using version attribute as well as validity attribute and expiration attribute. For example certain transport sessions may be terminated after some time and new session may start.

The version attribute indicates a version of this LSID element. The version is increased by one when the descriptor is updated. The received LSID element with highest version number is the currently valid version.

The validity attribute indicates date and/or time from which the LSID element is valid. The validity attribute may or may not be present. If not present, the receiver should assume the LSID element version is valid immediately.

The expiration attribute indicates date and time when the LSID element expires. The expiration attribute may or may not be present. If not present the receiver should assume the LSID element is valid for all time, or until it receives a newer LSID element with an associated expiration value.

The LSID element may contain at least one Transport-Session element. TransportSession element provides information about LCT transport sessions. Each TransportSession element may contain at least one of tsi attribute, SourceFlow element, and/or RepairFlow element.

tsi attribute specifies the transport session identifier. The session identifiers must not be 0.

SourceFlow element provides information of a source flow carried on this tsi.

RepairFlow element provides information of a repair flow carried on the tsi.

FIG. 6 illustrates a SourceFlow Element according to an embodiment of the present invention.

The source protocol is the core component of ROUTE in order to transmit delivery objects through a unidirectional channel. The source protocol establishes one or more source flows within a ROUTE session in order to deliver related objects in an object flow. Each object is recovered individually.

The source protocol is aligned with FLUTE as defined in RFC 6726 as well as the extensions defined in 3GPP TS 26.346, but also makes use of some principles of FCAST as defined in RFC 6968, for example, the object metadata and the object content may be sent together in a compound object. The source protocol is independent of the repair protocol, i.e. the source protocol may be deployed without the ROUTE repair protocol. Repair may be added only for certain deployment scenarios, for example, for mobile reception, in certain geographical areas, for certain services, etc.

The source protocol is defined by the description of a source flow. The source flow sends delivery objects. The source protocol uses ALC and LCT to deliver the objects.

Figure shows semantics of SourceFlow element. The following elements describes a source flow.

The SourceFlow element defines a source flow in session. The SourceFlow comprises at least one of an EFDT element, an idRef attribute, a realtime attribute, a minBufferSize attribute, an ApplicationIdentifier element, and/or at least one PayloadFormat element.

The EFDT element specifies the details of the file delivery data. This is the extended FDT instance. The EFDT may either be embedded or may be provided as a reference. If provided as a reference the EFDT may be updated independently of the LSID. If referenced, it shall be delivered as in-band object on TOI=0 of the included source flow.

The idRef attribute is a identification of the EFDT, it can be represented as a URI by the corresponding Transport Session.

The realtime attribute indicates whether or not the delivery objects and/or possibly associated FEC are delivered in realtime. If the realtime attribute is present and set to true, the ROUTE protocol may be used for real-time delivery. If the realtime attribute is present and set to true, LCT packets contain extension headers including NTP timestamps that express the presentation time of the included delivery object. If the realtime attribute is not present it is false.

The minBufferSize attribute defines the maximum amount of data that needs to be stored in the receiver. This value may be present if @realtime is set to true.

The ApplicationIdentifier element provides additional information that can be mapped to the application that is carried in this transport session, e.g. Representation ID of a DASH content or the Adaptation Set parameters of a DASH Representation in order to select the LCT transport session for rendering.

For example, the ApplicationIdentifier element may include mapping information. The mapping information may indicate a uniform resource locator (URL) of signaling information. In addition, mapping information may include an identifier allocated in the signaling information in addition to a unique address of a delivery object, an object, or a session. The identifier may include a period ID, an adaptation set ID, a representation ID, and/or a component ID. Therefore, in MPEG-DASH content, mapping information may include a segment URL, a representation ID, a component ID, an adaptation set ID, a period ID, etc.

For more perfect mapping, the ApplicationIdentifier element according to the present embodiment may further include mapping information for mapping an identifier or a URL an object to a TOI or a TSI. In other words, the ApplicationIdentifier element may further include information that indicates an identifier and/or a URL of an object to which a currently transmitted TOI and/or TSI is mapped. In this instance, the mapping information may be information for mapping an identifier and/or a URL of an object to a TOI and/or a TSI on a one-to-one basis, a one-to-many basis, or a many-to-one basis.

The PayloadFormat defines payload formats of ROUTE packets carrying the objects of the source flow. The PayloadFormat may comprise at least one of a codePoint attribute, a deliveryObjectFormat attribute, a fragmentation attribute, a deliveryOrder attribute, a sourceFecPayloadID attribute, and/or FECParameters.

The codePoint attribute defines what CodePoint value is used for this payload. This is the value of the CP field in the LCT header. When signaling this value, the delivery of the object shall follow the rules below.

The deliveryObjectFormat attribute specifies the payload format of the delivery object.

The fragmentation attribute indicates an unit of the delivery object. For example, if the fragmentation attribute is set to 0, the unit may be an arbitrary unit. If the fragmentation attribute is set to 1, the unit may be an application specific unit that is a sample based unit. If the fragmentation attribute is set to 2, the unit may be an application specific unit that is a collection of boxes.

The fragmentation attribute may indicate a unit of a delivery object transmitted by a packet. Alternatively, the fragmentation attribute may indicate a rule for dividing the delivery object. For example, the fragmentation attribute may indicate whether a DASH segment is divided in one of samples, boxes, and/or certain lengths.

An object may correspond to a segment of MPEG-DASH and/or an MPU of MMT, and the delivery object may correspond to a subcomponent included in the object. The delivery object refers to a unit of data that can be independently decoded and/or reproduced without depending on preceding data.

Examples of a unit of the delivery object may include a file, a fragment, a chunk, a GOP, an access unit, and/or an NAL unit. The unit of the delivery object is not limited thereto, and meaningful units may be further included.

The fragment may refer to a data unit including a pair of a movie fragment box (moof) and a media data container box (mdat). For example, the fragment may correspond to a subsegment of MPEG-DASH and correspond to a fragment of MMT. The fragment may include at least one chunk or at least one GOP.

The chunk corresponds to a set of adjacent samples having the same media type, and a data unit having a variable size.

The GOP corresponds to a basic unit for performing coding used in video coding, and a data unit having a variable size which indicates a set of frames including at least one I-frame. According to an embodiment of the present invention, media data is independently transmitted in delivery objects corresponding to meaningful data units, and thus the GOP may include an open GOP and/or a closed GOP.

In the open GOP, a B-frame in one GOP may refer to an I-frame or a P-frame of an adjacent GOP. Therefore, the open GOP may significantly enhance coding efficiency. In the closed GOP, a B-frame or a P-frame refers to only a frame in the GOP and does not refer to frames out of the GOP.

The access unit corresponds to a basic data unit of encoded video or audio, and may include one image frame or audio frame.

The NAL unit corresponds to an encapsulated and compressed video stream including summary information about a compressed slice based on communication with a network device. For example, the NAL unit may correspond to a data unit obtained by packetizing data such as a NAL unit slice, a parameter set, an SEI, etc. in bytes.

The deliveryOrder attribute indicates a delivery order of packets containing data of the delivery object. For example, if the deliveryOrder attribute is set to 0, the deliveryOrder attribute indicates an arbitrary order. If the deliveryOrder attribute is set to 1, the deliveryOrder attribute indicates an in-order delivery. If the deliveryOrder attribute is set to 2, the deliveryOrder attribute indicates that media samples are delivered as an in-order delivery and that the media samples are delivered prior to movie fragment box.

The delivery object may include a header and a payload. An order of generating and/or consuming the header of the delivery object may be different from an order of generating and/or consuming the payload of the delivery object. The receiver according to the present embodiment may reproduce the delivery object by rearranging packets, which are received in a generated order, in a consumed order.

A detailed description will be given of a case in which the deliveryOrder attribute is set to 0.

The broadcast transmission apparatus may transmit packets including data of the delivery object in an arbitrary order. The broadcast reception apparatus may receive packets in an arbitrary order and rearrange the packets. Then, the broadcast reception apparatus may accurately restore, parse, and/or reproduce the delivery object.

A detailed description will be given of a case in which the deliveryOrder attribute is set to 1.

When media data is previously encoded or a source block is previously generated, a transmission order of packets including the data of the delivery object may be the same as an order of parsing the packets. For example, the broadcast transmission apparatus may first transmit packets corresponding to the header of the delivery object, and then transmit packets corresponding to the payload of the delivery object later. The broadcast reception apparatus may first receive the packets corresponding to the header of the delivery object, and then receive the packets corresponding to the payload of the delivery object later. Thereafter, the broadcast reception apparatus may accurately restore, parse, and/or reproduce the delivery object.

A detailed description will be given of a case in which the deliveryOrder attribute is set to 2.

The broadcast transmission apparatus according to the present embodiment may first generate the payload of the delivery object, and then generate the header of the delivery object in order to generate the delivery object. In this instance, the broadcast transmission apparatus may generate a source block including media data in the payload of the delivery object. For example, at least one source block including media data which is included in a media data box (mdat) may be successively generated. Thereafter, the broadcast transmission apparatus may generate a source block including the header of the delivery object.

To transmit media content in real time, the broadcast transmission apparatus may transmit source blocks in the generated order. In other words, the broadcast transmission apparatus may first transmit source blocks (or packets) including the payload of the delivery object, and then transmit source blocks (or packets) including the header of the delivery object later.

In this case, the broadcast reception apparatus according to the present embodiment may receive and rearrange the packets. Then, the broadcast reception apparatus may accurately restore the delivery object. The broadcast reception apparatus may first parse the header of the delivery object, and then parse the payload of the delivery object.

The sourceFecPayloadID attribute defines the format of the Source FEC Payload ID. For example, if the sourceFecPayloadID attribute is set to 0, the source FEC payload ID is absent and the entire delivery object is contained in this packet. The FECParameters shall be absent. If the sourceFecPayloadID attribute is set to 1, the source FEC payload ID is 32 bit and expresses the start offset in the object. The FECParameters shall be absent. If the sourceFecPayloadID attribute is set to 2, the FECParameters defines the Format of the Source FEC Payload ID.

A detailed description will be given of a case in which the sourceFecPayloadID attribute is 1.

In this case, the source FEC payload ID may indicate a location of a first byte of a payload of a packet that transmits the delivery object. The source FEC payload ID may indicate an offset (temporal position or spatial position) of a packet payload which is currently transmitted in an object.

The broadcast reception apparatus may recognize an order of delivery objects and/or packets currently transmitted in an object based on the source FEC payload ID. The broadcast reception apparatus may successively align packets received based on the source FEC payload ID, and accurately restore, parse, and/or decode each of the delivery objects and/or objects.

The FECParameters element defines the FEC parameters. This includes the FEC-encoding-id, the instance-id, etc. It is specifically used to signal the applied Source FEC Payload ID.

Figures 7, 8:
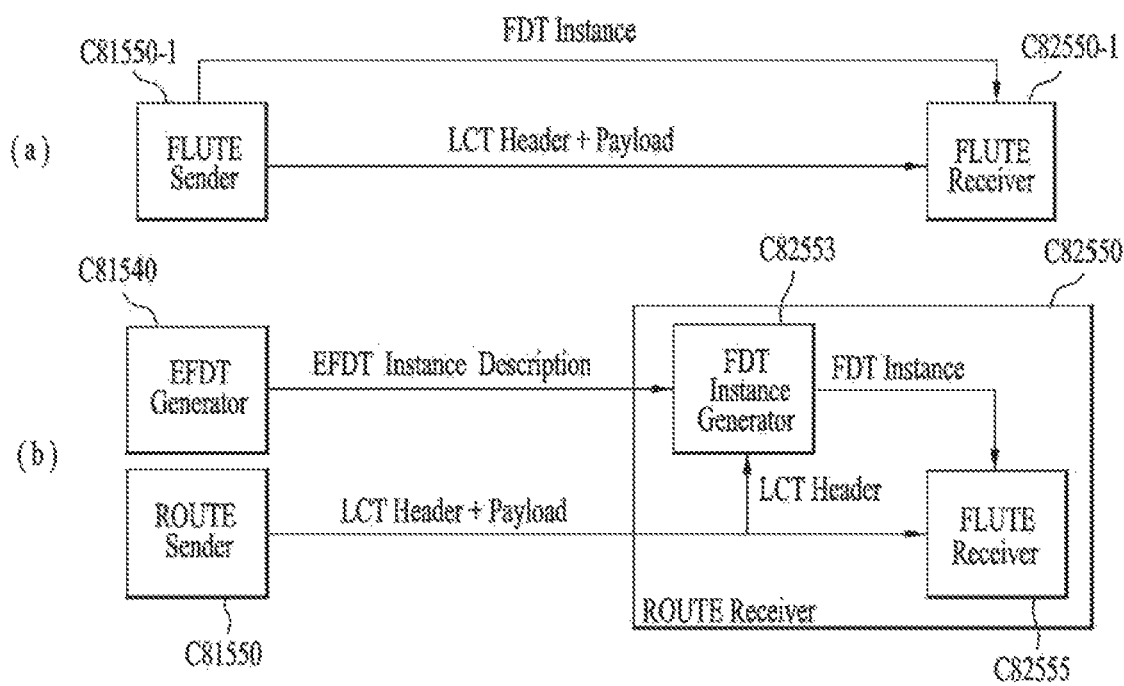
FIG. 7 is a diagram illustrating a format of a delivery object according to an embodiment of the present invention.
FIG. 8 is a diagram illustrating a comparison between ROUTE distribution in a file mode and FLUTE distribution according to an embodiment of the present invention.

FIG. 7 illustrates a format of a delivery object according to an embodiment of the present invention.

The ROUTE protocol enables delivery of entire delivery objects. Delivery objects are the key component of this protocol as the receiver recovers delivery objects and passes those to the application. A delivery object is self-contained for the application, typically associated with certain properties, metadata and timing-related information that are of relevance for the application. In some cases the properties are provided in-band along with the object, in other cases the data needs to be delivered out-of-band in a static or dynamic fashion.

Delivery object may comprise complete or partial files described and accompanied by "FDT Instance". And, Delivery object may comprise HTTP Entities (HTTP Entity Header and HTTP Entity Body) and/or packages of delivery objects.

In case that the delivery object is complete or partial files, and HTTP Entities, the delivery object may be further differentiated by whether it corresponds to a full file or a byte range of a file, along with FDT Instance. And, the delivery object may be further differentiated by whether it represents timed or in non-timed delivery. If timed, certain real-time and buffer restrictions apply and specific extension headers may be used. And, the delivery object may be further differentiated by usage of dynamic and/or static metadata to describe delivery object properties. And, the delivery object may be further differentiated by delivery of specific data structures, especially ISO BMFF structures. In this case a media-aware packetization or a general packetization may be applied.

The DeliveryObjectFormatID specifies which of the formats are used in order to provide information to the applications. The delivery object format comprises at least one of File Mode, Entity Mode, Package Mode.

In the file mode, the delivery object represents a file or a byte range of the file.

In the entity mode, the delivery object represents an entity as defined in RFC 2616. An entity consists of entity-header fields and an entity-body. The mode reuses the major concepts of FCAST as defined in RFC 6968, but permits delivery of any type of HTTP entity headers including extension headers, etc. The entity-header field sent along with the file provides all information for the contained complete or partial file. Note that if the header contains a Content-Range entity-header then the delivery object only contains a byte range of the delivered file. In addition, this mode also allows for chunked delivery in case the entity-header contains the signaling.

In Package mode, the delivery object consists of a group of files that are packaged for delivery only. If applied then this packaging is only applied for the purpose of delivery and the client shall un-package the package and provide each file as an independent file to the application. Packaging is supported by Multipart MIME, where objects are packaged into one document for transport. Packaged files shall be delivered using the file mode with Content-Type set to multipart. If a file is delivered in package mode, then the ROUTE receiver must un-package the data whereas if a format is delivered in regular file mode, then a package is handed to the application.

FIG. 8 illustrates a comparison between ROUTE distribution in a file mode and FLUTE distribution according to an embodiment of the present invention.

FIG. 8(a) illustrates a broadcast transmission apparatus (for example, a FLUTE sender C81550-1) and/or a broadcast reception apparatus (for example, a FLUTE receiver C82550-1) using FLUTE.

The FLUTE sender C81550-1 may transmit at least one LCT packet including at least one object and/or signaling information. The signaling information may include an FDT instance. The LCT packet may include a header (LCT header) and/or a payload (LCT payload).

In FLUTE, FDT instances are delivered in-band and need to be generated and delivered in real-time if objects are generated in real-time at the sender.

The File Delivery Table (FDT) provides a means to describe various attributes associated with files that are to be delivered within the file delivery session. The FDT is a set of file description entries for files to be delivered in the session. Each file description entry MUST include the TOI for the file that it describes and the URI identifying the file.

FDT Instance describes a file (or, object) before it is able to recover the file (or, object) itself. Within the file delivery session, the FDT is delivered as FDT Instances. An FDT Instance contains one or more file description entries of the FDT. Any FDT Instance can be equal to, be a subset of, be a superset of, overlap with, or complement any other FDT Instance. A certain FDT Instance may be repeated multiple times during a session, even after subsequent FDT Instances (with higher FDT Instance ID numbers) have been transmitted. Each FDT Instance contains at least a single file description entry and at most the exhaustive set of file description entries of the files being delivered in the file delivery session.

The FLUTE receiver C82550-1 may receive at least one LCT packet including at least one object and/or signaling information. The FLUTE receiver C82550-1 may restore and/or reproduce at least one object (or file) based on the signaling information.

A FLUTE protocol may not transmit and/or receive at least one object in real time.

FIG. 8(b) illustrates a broadcast transmission apparatus and/or a broadcast reception apparatus using ROUTE.

The broadcast transmission apparatus may transmit at least one LCT packet including at least one delivery object and/or signaling information. The signaling information may include an EFDT instance description. The LCT packet may include a header (LCT header) and/or a payload (LCT payload).

A controller of the broadcast transmission apparatus may include at least one of a signaling information generator (EFDT generator) C81540 and/or a ROUTE sender C81550. The signaling information generator C81540 may be included in the ROUTE sender C81550 and present independently of the ROUTE sender C81550.

The signaling information generator C81540 may generate signaling information including information about discovery and description of a broadcast service. The signaling information generator C81540 may include the EFDT generator.

The signaling information generator C81540 may generate an EFDT instance description. The EFDT instance description is an extended FDT instance descriptor including data that can generate an FDT instance description.

The ROUTE sender C81550 may generate at least one delivery object.

The broadcast reception apparatus may receive at least one LCT packet including at least one delivery object and/or signaling information. The broadcast reception apparatus may restore and/or reproduce the at least one delivery object and/or the signaling information based on the at least one LCT packet. The broadcast reception apparatus may restore and/or reproduce the at least one delivery object based on the signaling information.

A controller of the broadcast reception apparatus may include a ROUTE receiver C82550. The ROUTE receiver C82550 may receive at least one packet including at least one delivery object and/or signaling information. The ROUTE receiver C82550 may restore the at least one delivery object and/or the signaling information based on at least one packet. The ROUTE receiver C82550 may restore the at least one delivery object based on the signaling information. The signaling information may include an EFDT instance description.

For example, the ROUTE receiver C82550 may include an FDT instance generator C82553 and/or a FLUTE receiver C82555. The FDT instance generator C82553 may generate at least one FDT instance based on the EFDT instance description and/or the LCT header. The FLUTE receiver C82555 may restore at least one delivery object based on at least one LCT packet and/or at least one FDT instance.

In the file mode, the delivery object represents a file or a byte range of the file. The mode is replicating FLUTE as defined in RFC 6726, but with the ability to send metadata in a static manner as shown in Figure.

In ROUTE, compared to the FDT in RFC 6726 and TS26.346, the FDT is extended with some functionalities including the ability to provide rules to generate the File element on-the-fly based on using the information in the extended FDT and the LCT header.

The extended FDT together with the LCT packet header may be used to generate the FDT-equivalent descriptions for the delivery object. This avoids the necessity of continuously sending the FDT for real-time objects.

The figure is not enforcing any implementation, but is only providing a reference model.

The following methods (non-exhaustive) can be used for delivering the extended FDT (note: ATSC may select a subset of these options).

The extended FDT may be delivered as an element embedded in the SourceFlow element of the LSID.

And, The extended FDT may be delivered as a separate delivery object referenced by the LSID and which is in turn carried a) in the same ROUTE session whose constituent LCT session carries the delivery object described by this EFDT; and/or b) in a ROUTE session or in an IP multicast stream which is separate from the ROUTE session and constituent LCT session carrying the delivery object described by this EFDT; and/or c) over the broadband network.

And, the extended FDT may be delivered in-band without referencing in alignment with the FDT.

A ROUTE protocol according to an embodiment of the present invention may generate delivery objects by dividing an object. As a result, the ROUTE protocol may transmit and/or receive at least one delivery object in real time.

FIG. 9 illustrates an EFDT according to an embodiment of the present invention.

EFDT is an extended FDT instance descriptor (Note that all FDT parameters are also include). EFDT comprises at least one of route:idRef attribute, route:version attribute, route:maxExpiresDelta attribute, route:maxTransportSize attribute, and/or route:FileTemplate element.

route:idRef attribute indicates an identification of the EFDT.

route:version attribute indicates a version of this extended FDT instance descriptor. The version if increased by one when the descriptor is updated. The received EFDT with highest version number is the currently valid version.

route:maxExpiresDelta attribute indicates a maximum expiry time for an object in the Transport Session after sending the first packet associated to this object.

route:maxTransportSize attribute indicates a maximum transport size of any object described by this EFDT. Shall be present if not present in FEC_OTI.

route:FileTemplate element specifies the file URL or file template in the body.

If the FileTemplate element is absent, the EFDT shall conform to an FDT Instance according to TS 26.346. This means that at least one File element must be present; and the @expires attribute must be present.

If a FileTemplate element is present, then the sender shall include the following information. The TOI shall be set such that Content-Location can be derived. After sending the first packet of a TOI, none of the packets pertaining to this TOI shall be sent later than as indicated in @maxExpiresDelta. In addition, the EXT_TIME header with Expected Residual Time (ERT) may be used in order to convey more accurate expiry time, if considered useful. If @maxExpiresDelta is not present, then the EXT_TIME header with Expected Residual Time (ERT) shall be used to signal the value of @Expires.

If a FileTemplate element is present, an FDT instance is generated by the processes defined in the following. Any data that is contained in the EFDT may be used as is in generating an FDT Instance. The data in the FileTemplate element is used to generate an FDT Instance with the reception of an LCT packet with a specific TOI value.

If an LCT packet with a new TOI is received for this transport session, then an FDT Instance is generated with a new File entry as follows. The TOI is used to generate File@Content-Location. All other parameters that are present in the EFDT element are associated to the File attribute. Either the EXT_FTI or the EXT_TOL header shall be used to extract any relevant FEC Transport Information and map into the File parameters. Note that in ROUTE this header does not need to be present as the TOL can be derived from the last packet (indicated with the B flag) and provides the sum of the start offset and the packet duration. If present, the @maxExpiresDelta shall be used to generate the value of the @Expires attribute. The receiver shall add this value to the current time at the receiver to obtain the value for @Expires. If not present, the EXT_TIME header with Expected Residual Time (ERT) shall be used to extract the expiry time of the FDT instance. If both are present, the smaller of the two values should be used as the value for the @Expires.

FIG. 10 illustrates identifiers for file templates according to an embodiment of the present invention.

If the FileTemplate element is present, the value of FileTemplate element may contain the identifier listed in Figure.

If no identifier is present, then the FileTemplate shall be a valid URL and the URL is associated to the object with the transport object identifier (TOI) number in this Transport Session.

If the $TOI$ is present, then the element is used to generate one to one mapping between the TOI and URL.

In each URI, the identifiers from Figure shall be replaced by the substitution parameter defined in Figure. Identifier matching is case-sensitive. If the URI contains unescaped $ symbols which do not enclose a valid identifier then the result of URI formation is undefined. The format of the identifier is also specified in Figure.

Each identifier may be suffixed, within the enclosing '$' characters following this prototype.

"%0[width]d"

The width parameter is an unsigned integer that provides the minimum number of characters to be printed. If the value to be printed is shorter than this number, the result shall be padded with zeroes. The value is not truncated even if the result is larger.

The FileTemplate shall be authored such that the application of the substitution process results in valid URIs.

Strings outside identifiers shall only contain characters that are permitted within URIs according to RFC 3986.

Figure 11:
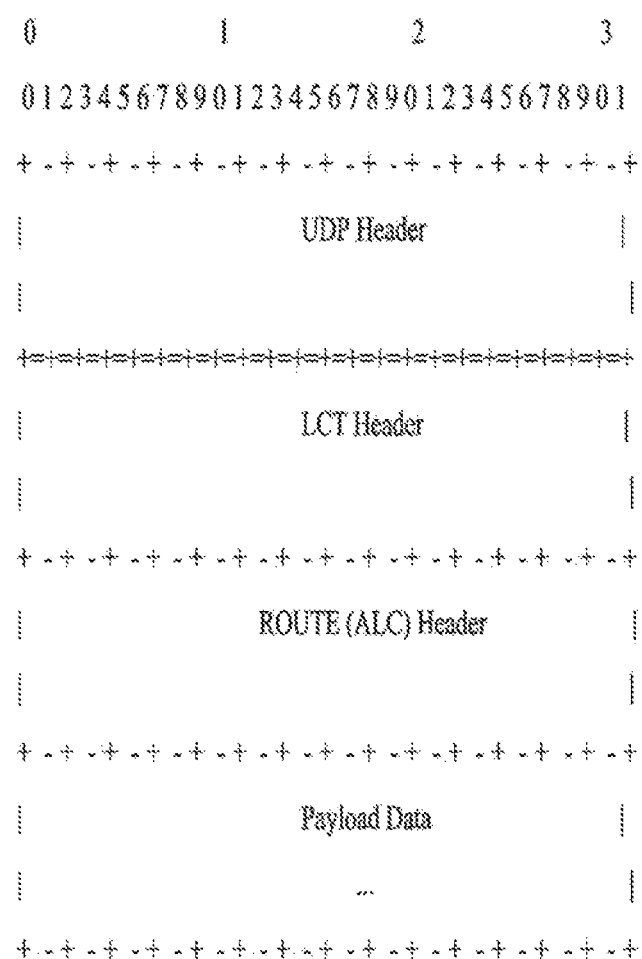
FIG. 11 is a diagram illustrating a ROUTE packet format according to an embodiment of the present invention.

FIG. 11 illustrates a ROUTE packet format according to an embodiment of the present invention.

The overall ROUTE packet format is depicted in Figure. The packet is an IP packet, either IPv4 or IPv6, and the IP header precedes the UDP header. The ROUTE packet format has no dependencies on the IP version number.

The packet format used by ROUTE follows the ALC packet format, i.e. the UDP header followed by the LCT header and a Source FEC Payload ID followed by the packet payload. The LCT header is defined in the LCT building block in RFC 5651. The Source FEC Payload ID in ROUTE is typically the start offset, provided either directly or provided by any FEC scheme.

A ROUTE packet may include at least one of a UDP header, an LCT header, a ROUTE (ALC) header, and/or payload data.

UDP is a communication protocol of a transport layer which provides only a restricted service when messages are exchanged between computers in a network using an IP. The UDP header may include at least one of a source port field, a destination port field, a length field, and/or a checksum field. The source port field may indicate a port on a transmitting side. The destination port field may indicate a port on a receiving side. The length field may indicate a length of a whole packet. The checksum field may include information for error detection.

ALC corresponds to a protocol standardized such that reliability and complexity can be controlled through several channels while a single transmitter transmits files to several receivers. ALC corresponds to a combination of an FEC building block for error control, a WEBRC building block for complexity control, and/or an LCT building block for session and channel management, and the building blocks may be configured based on a service if necessary. A ROUTE header according to an embodiment of the present invention may include an ALC header.

LCT supports a transmission level for a stream transmission protocol and reliable content transmission. LCT provides information about content and characteristics of basic information to be delivered to a receiver. The LCT packet header fields shall be used as defined by the LCT building block in RFC 5651. The LCT header may include at least one of an LCT version number field (V), a congestion control flag field (C), a reserved field (R), a transport session identifier flag field (S), a transport object identifier flag field (0), a half-word flag field (H), a sender current time present flag field (T), an expected residual time present flag field (R), a close session flag field (A), a close object flag field (B), an LCT header length field (HDR_LEN), a code point field (CP), a congestion control information field (CCI), a transport session identifier field (TSI), a transport object identifier field (TOI), a header extensions field, and/or an FEC payload ID field.

LCT version number field(V) indicates the protocol version number. For example, this field indicates the LCT version number. The version number field of the LCT header MUST be interpreted as the ROUTE version number field. This version of ROUTE implicitly makes use of version 1 of the LCT building block defined in RFC 5651. For example, the version number is '0001b'.

Congestion control flag field(C) indicates the length of Congestion Control Information field.

The reserved field (R) is reserved for future use. For example, the reserved field (R) may be a protocol-specific indication field (PSI). The protocol-specific indication field (PSI) may be used as an indicator for a particular purpose in an LCT upper layer protocol. PSI field indicates whether the current packet is a source packet or an FEC repair packet. As the ROUTE source protocol only delivers source packets. This field shall be set to '10b'.

Transport Session Identifier flag field(S) indicates the length of Transport Session Identifier field.

Transport Object Identifier flag field(O) indicates the length of Transport Object Identifier field. For example, the TOI may correspond to identification information of a delivery object.

The half-word flag field (H) indicates whether to add a half word (16 bits) to lengths of the TSI and the TOI.

Sender Current Time present flag field(T) indicates whether the Sender Current Time (SCT) field is present or not. T=0 indicates that the Sender Current Time (SCT) field is not present. T=1 indicates that the SCT field is present. The SCT is inserted by senders to indicate to receivers how long the session has been in progress.

Expected Residual Time present flag field(R) indicates whether the Expected Residual Time (ERT) field is present or not. R=0 indicates that the Expected Residual Time (ERT) field is not present. R=1 indicates that the ERT field is present. The ERT is inserted by senders to indicate to receivers how much longer the session/object transmission will continue.

The close session flag field (A) indicates that a session has ended or is about to end.

The close object flag field (B) indicates that a delivery object, which is being transmitted, has ended or is about to end.

LCT header length field(HDR_LEN): indicates total length of the LCT header in units of 32-bit words.

Codepoint field(CP) indicates the type of the payload that is carried by this packet. Depending on the type of the payload, additional payload header may be added to prefix the payload data.

The congestion control information field (CCI) is used to transmit congestion control information such as layer numbers, logical channel numbers, sequence numbers, etc. The Congestion Control Information field in the LCT header contains the required Congestion Control Information.

The transport session identifier field (TSI) is a unique identifier of a session. The TSI uniquely identifies a session among all sessions from a particular sender. This field identifies the Transport Session in ROUTE. The context of the Transport Session is provided by the LSID (LCT Session Instance description).

The transport object identifier field (TOI) is a unique identifier of an object and/or a delivery object. The TOI indicates which object within the session this packet pertains to. This field indicates to which object within this session the payload of the current packet belongs to. The mapping of the TOI field to the object is provided by the Extended FDT. Extended FDT specifies the details of the file delivery data. This is the extended FDT instance. If more than one object is carried in the session, then the Transmission Object ID (TOI) within the LCT header MUST be used to identify from which object the packet payload data is generated.

The header extensions field is used as an LCT header extension part for transmission of additional information. The Header Extensions are used in LCT to accommodate optional header fields that are not always used or have variable size. For example, EXT_TIME extension is used to carry several types of timing information. It includes general purpose timing information, namely the Sender Current Time (SCT), Expected Residual Time (ERT), and Sender Last Change (SLC) time extensions described in the present document. It can also be used for timing information with narrower applicability (e.g., defined for a single protocol instantiation); in this case, it will be described in a separate document.

The FEC payload ID field may include identification information of a transmission block or an encoding symbol. An FEC payload ID may indicate an identifier corresponding to a case in which the file is FEC-encoded.

The payload data may include data of at least one transmission block and/or encoding symbol. The packet payload contains bytes generated from an object. If more than one object is carried in the session, then the Transmission Object ID (TOI) within the LCT header MUST be used to identify from which object the packet payload data is generated.

The ROUTE source protocol is based on ALC as defined in RFC 5775 with the following details.

Firstly, The Layered Coding Transport (LCT) Building Block as defined in RFC 5651 is used with the following constraints. The Congestion Control Information (CCI) field in the LCT header may be set to 0. The TSI in the LCT header shall be set according to LCT transport session; this packet applies as defined in the LSID. The Code Point in the LCT header shall be used to signal the applied formatting as defined in the LSID. The first bit of the PSI shall be set to 1 to indicate a source packet.

According to ALC, a source FEC Payload ID is used that specifies the starting address in octets of the delivery object. This information may be sent in several ways comprising at least one of a simple new FEC scheme, Existing FEC schemes, and/or the LSID.

A simple new FEC scheme enables a scheme with source FEC Payload ID set to size 0. In this case the packet shall contain the entire object. And, source FEC Payload ID can indicate a direct address (start offset) using 32 bit.

Existing FEC schemes are widely deployed using the Compact No-Code as defined in RFC 5445. And, Existing FEC schemes are widely deployed in a compatible manner to RFC 6330 where the SBN and ESI defines the start offset together with the symbol size T.

The LSID provides the appropriate signaling to signal any of the above modes using the @sourceFecPayloadID attribute and the FECParameters element.

Secondly, The LCT Header EXT_TIME extension as defined in RFC 5651 may be used by sender in the following manner. The Sender Current Time may be used to occasionally or frequently signal the sender current time depending on the application. This may be used in order to synchronize the clock of the sender and the receiver, or to measure jitter and delivery latency. The Expected Residual Time (ERT) may be used to indicate the expected remaining time for the current object. The SLC flag is typically of no use, but may be used to indicate addition/removal of Segments.

Thirdly, Additional extension headers may be used to support real-time delivery. Such extension headers are defined below.

Fourthly, The LCT Session description information is communicated through the LCT Session Instance Description (LSID).

Fifthly, The ROUTE session description is communicated by external means.

The main changes that ROUTE introduces to the usage of the LCT building block are the following. ROUTE limits the usage of the LCT building block to a single channel per session. Congestion control is thus sender-driven in ROUTE. The functionality of receiver-driven layered multicast may still be offered by the application, allowing the receiver application to select the appropriate delivery session based on the bandwidth requirement of that session.

In some special cases a ROUTE sender may need to produce ROUTE packets that do not contain any payload. This may be required, for example, to signal the end of a session or to convey congestion control information. These data-less packets do not contain ROUTE Header or Payload Data, but only the LCT header fields. The total datagram length, conveyed by outer protocol headers (e.g., the IP or UDP header), enables receivers to detect the absence of the ROUTE (ALC) header and payload.

Figure 12:
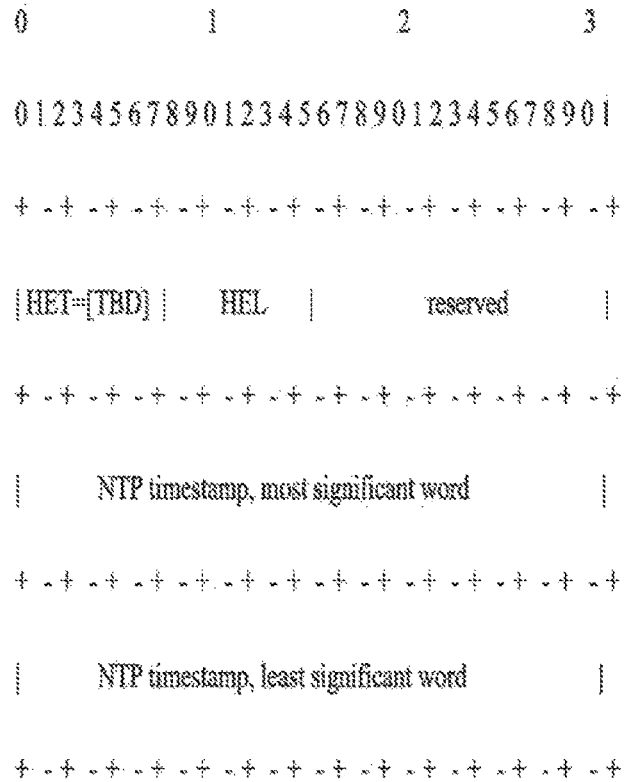
FIG. 12 is a diagram illustrating an EXT_PRESENTATION_TIME header according to an embodiment of the present invention.

FIG. 12 illustrates an EXT_PRESENTATION_TIME header according to an embodiment of the present invention.

For proper operation of the protocol in different circumstances, LCT extension headers are defined that support the operation of the ROUTE protocol for different purposes. The headers need to be registered with IANA according to Section 9 of RFC 5651.

LCT extension header may comprise at least one of EXT_PRESENTATION_TIME Header and/or EXT_TIME Header.

EXT_PRESENTATION_TIME Header expresses the time when the object contained in the packet is due for presentation in wall-clock time. EXT_PRESENTATION_TIME Header may be added to an LCT packet. A fixed length header is to be registered.

If present, it expresses the third, fourth and fifth octet of 64 bit timestamp. The value must always be greater than the SCT (Sender Current Time). Or it expresses 64-bit NTP (Network Time Protocol) time stamp value as the Figure.

Figure illustrates the EXT_PRESENTATION_TIME Header according to an embodiment of the present invention.

EXT_PRESENTATION_TIME Header may include at least one of a Header Extension Type (HET) field, a Header Extension Length (HEL) field, a reserved field, and/or a NTP timestamp.

The HET field may indicate the corresponding Header Extension type. The HET field may be an integer of 8 bits. HET values (To Be Determined, TBD) from 0 to 127 are used for variable-length Header Extensions. HET values from 128 to 255 are used for fixed-length 32-bit Header Extensions.

The HEL field may indicate the length of the whole Header Extension field, expressed in multiples of 32-bit words. The HEL field may be an integer of 8 bits. This field MUST be present for variable-length extensions (HETs between 0 and 127) and MUST NOT be present for fixed-length extensions (HETs between 128 and 255).

NTP timestamp may express the time when the object contained in the packet is due for presentation in wall-clock time. The NTP timestamp is a 64 bit binary value with an implied fraction point between the two 32 bit halves. The NTP timestamp may include a 32-bit unsigned seconds field(most significant word) spanning 136 years and a 32-bit fraction field(least significant word) resolving 232 picoseconds.

In addition the EXT_TIME headers as defined in RFC 5651 may be used and SCT-high and SCT-low flags may be set. EXT_TIME Header is used to carry several types of timing information. It includes a HET field, a HEL field, a Use field, and/or at least one general purpose timing information.

The Use field indicates the semantic of the following 32-bit time value(s). Use field may include at least one of SCT-high flag, SCT-low flag, ERT flag, and/or SLC flag.

Several "time value" fields MAY be present in a given EXT_TIME Header Extension, as specified in the Use field.

The general purpose timing information may include at least one of a Sender Current Time (SCT), an Expected Residual Time (ERT), and/or a Sender Last Change (SLC) time extensions.

The SCT represents the current time at the sender at the time this packet was transmitted. The SCT may be used to occasionally or frequently signal the sender current time depending on the application. This may be used in order to synchronize the clock of the sender and the receiver, or to measure jitter and delivery latency.

The ERT represents the sender expected residual transmission time for the transmission of the current object. The ERT may be used to indicate the expected remaining time for the current object.

The SLC time is the server wall clock time, in seconds, at which the last change to session data occurred. The SLC flag is typically of no use, but may be used to indicate addition/removal of Segments.

Figure 13:
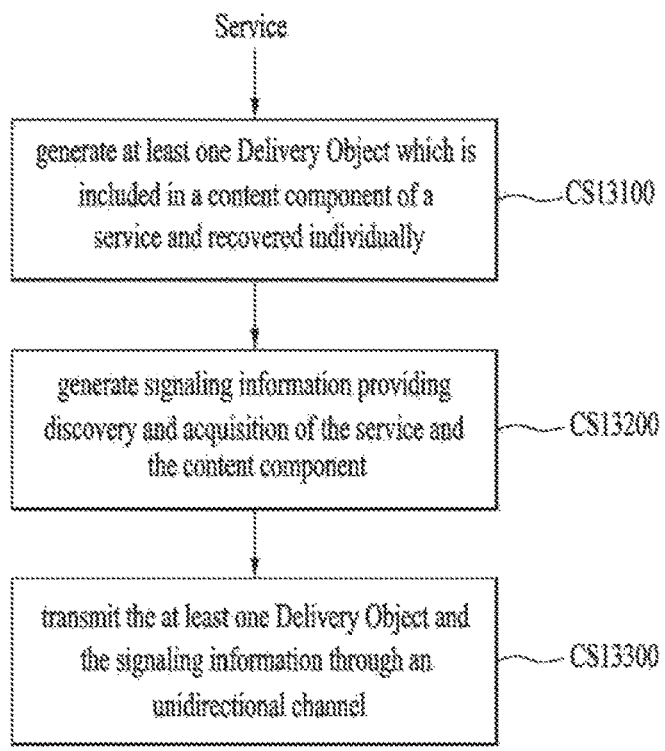
FIG. 13 is a flowchart illustrating an operation of the broadcast transmission apparatus according to an embodiment of the present invention.

FIG. 13 illustrates an operation of the broadcast transmission apparatus according to an embodiment of the present invention.

The broadcast transmission apparatus may encode a broadcast service using an encoder & DASHer. For example, the broadcast service may include at least one of signaling data, ESG data, NRT content data, and/or real-time content data. The NRT content data, and/or the real-time content data may include media data. The media data may include at least one of video data, audio data, and/or closed caption data.

The encoded broadcast service may be encapsulated in at least one segment of MPEG-DASH. A file format of a segment of MPEG-DASH may be an ISO BMFF. For example, video data, audio data, and/or closed caption data may be encapsulated in at least one segment of MPEG-DASH.

The broadcast transmission apparatus may generate at least one delivery object which is included in at least one content component of a service and individually recovered using a ROUTE sender and/or a delivery object generator (CS13100).

The delivery object may be one of a file, a part of the file, a group of the file, an HTTP entity, and a group of the HTTP entity.

The delivery object may include object-based media data. For example, the delivery object may include an MPEG-DASH media segment file and/or a part of the MPEG-DASH media segment file.

The delivery object may include data related to a segment.

In the basic operation, it is assumed that a delivery object is fully available at the ROUTE sender. And, it is assumed that T>0 is the Transfer-Length of the object in bytes. The maximum transfer unit of the first data packet is known as Y. The transfer unit is determined either by knowledge of underlying transport block sizes or by other constraints.

In case Y is greater than or equal to T, this is the only packet for this delivery object. Therefore, the Codepoint field(CP) may be set indicating a packet header size of 0. The entire delivery object is then carried as the payload of the packet.

If Y is smaller than T, then the data carried in the payload of a packet consists of a consecutive portion of the object. Then for any arbitrary X and any arbitrary Y>0 as long as X+Y is at most T, a ROUTE packet may be generated. In this case the following shall hold that the data carried in the payload of a packet shall consist of a consecutive portion of the object starting from the beginning of byte X through the beginning of byte X+Y. And, the start offset in the ROUTE packet header shall be set to X and the payload data shall be added into the packet to send. If X+Y is identical to T, the payload header flag B (i.e. Close Object flag field(B)) shall be set to "1", else the payload header flag B shall be set to "0".

The broadcast transmission apparatus may generate signaling information providing discovery and acquisition of a service and at least one content component using a signaling information generator (CS13200).

The signaling information may include first information that describes a transport session for transmitting the at least one content component of the service. For example, the first information may include service layer signaling (SLS), LCT session instance description (LSID), and/or service-based transport session instance description (S-TSID).

The signaling information may include ROUTE session description, LCT transport session description (or LCT session description), and/or delivery object metadata (or object metadata). The ROUTE session description may include signaling information related to a ROUTE session. The LCT transport session description may include signaling information related to an LCT transport session. The delivery object metadata may include signaling information related to a delivery object.

The signaling information (for example, service signaling) may provide discovery of a service and description information. The signaling information may include bootstrapping signaling information (fast information table (FIT)) and/or service layer signaling information (service layer signaling (SLS)). The signaling information may include information necessary to discover or acquire at least one user service.

The FIT enables a receiver to build a basic service list and bootstrap discovery of service layer signaling for each service. In an embodiment, the FIT may be expressed by a service list table (SLT). The FIT (or SLT) may be transmitted through link layer signaling. Alternatively, the FIT (or SLT) may be transmitted in each physical layer frame for rapid acquisition. In an embodiment, the FIT (or SLT) may be transmitted through at least one of a physical layer frame, a PLP for transmission of a signal, and/or a PLP allocated to each broadcaster.

SLS enables the receiver to discover and access at least one service and/or at least one content component. When the SLS is transmitted through broadcast, the SLS may be transmitted in at least one LCT transport session included in a ROUTE session by the ROUTE/UDP/IP. In this instance, the SLS may be transmitted at a suitable carousel rate that supports rapid channel joining and switching. When the SLS is transmitted through broadband, the SLS may be transmitted by the HTTP(S)/TCP/IP.

The LSID may describe all transport sessions transmitted through the ROUTE session. The LSID may be transmitted through the same ROUTE session as a ROUTE session including LCT transport sessions or transmitted by another means other than the ROUTE session. For example, the LSID may be transmitted through unicast or another ROUTE session.

The S-TSID is an SLS metadata fragment including at least one ROUTE session, at least one LCT session included in ROUTE, and/or overall transport session description information for at least one MMTP session. At least one media content component included in a service may be transmitted through the ROUTE session and/or the MMTP session. In addition, the S-TSID may include a delivery object transmitted in at least one LCT session included in a service, file metadata for an object flow, and/or a description. In addition, the S-TSID may include payload formats and/or additional information for at least one content component transmitted in at least one LCT session.

The first information may include second information that describes source data transmitted through the transmission session. For example, the second information may include the SourceFlow element. The SourceFlow element may define a source flow in a session.

The second information may include at least one of an EFDT element that specifies details of file delivery data, an idRef attribute that identifies the EFDT element, a realtime attribute that indicates whether the delivery object is transmitted in real time, a minBufferSize attribute that defies a maximum amount of data necessary to be stored in the receiver, an ApplicationIdentifier element that provides information which can be mapped to an application, and/or a PayloadFormat element that defines a payload format of a packet that transmits the delivery object.

The PayloadFormat element may include at least one of a codePoint attribute that defines a CodePoint value used for the payload, a deliveryObjectFormat attribute that specifies a payload format of the delivery object, a fragmentation attribute that indicates a unit of the delivery object, a deliveryOrder attribute that indicates a transmission order of packets including data of the delivery object, a sourceFecPayloadID attribute that defines a format of a source FEC payload ID, and/or an FECParamenters element that defines FEC parameters.

The EFDT element may include at least one of an idRef attribute that identifies the EFDT element, a version attribute that indicates a version of the EFDT element, a maxExpiresDelta attribute that indicates a maximum expiration time for an object in the transmission session, a maxTransportSize attribute that indicates a maximum transmission size of an object described by the EFDT element, and/or a FileTemplate element that specifies a URL of a file.

The broadcast transmission apparatus may transmit the at least one delivery object and the signaling information through a unidirectional channel using the transmitter (CS13300).

For example, the broadcast transmission apparatus may transmit the at least one delivery object and the signaling information using an LCT packet.

The order of packet delivery is arbitrary, but in the absence of other constraints delivery with increasing start offset number is recommended. Certain applications may require a strict sending order with increasing start offset number.

In other cases, the transfer length may be unknown prior to sending earlier pieces of the data, and only a maximum transfer length is known as signaled in the EFDT parameter @route:maxTransportSize. In this case, T may be determined later. However, this does not affect the sending process above. Additional packets may be sent following the rules from above. In this case the B flag shall only be set to '1' for the payload that contains the last portion of the object.

Therefore, the broadcast transmission apparatus may transmit object-based media data through the broadcast network in real time.

Figure 14:
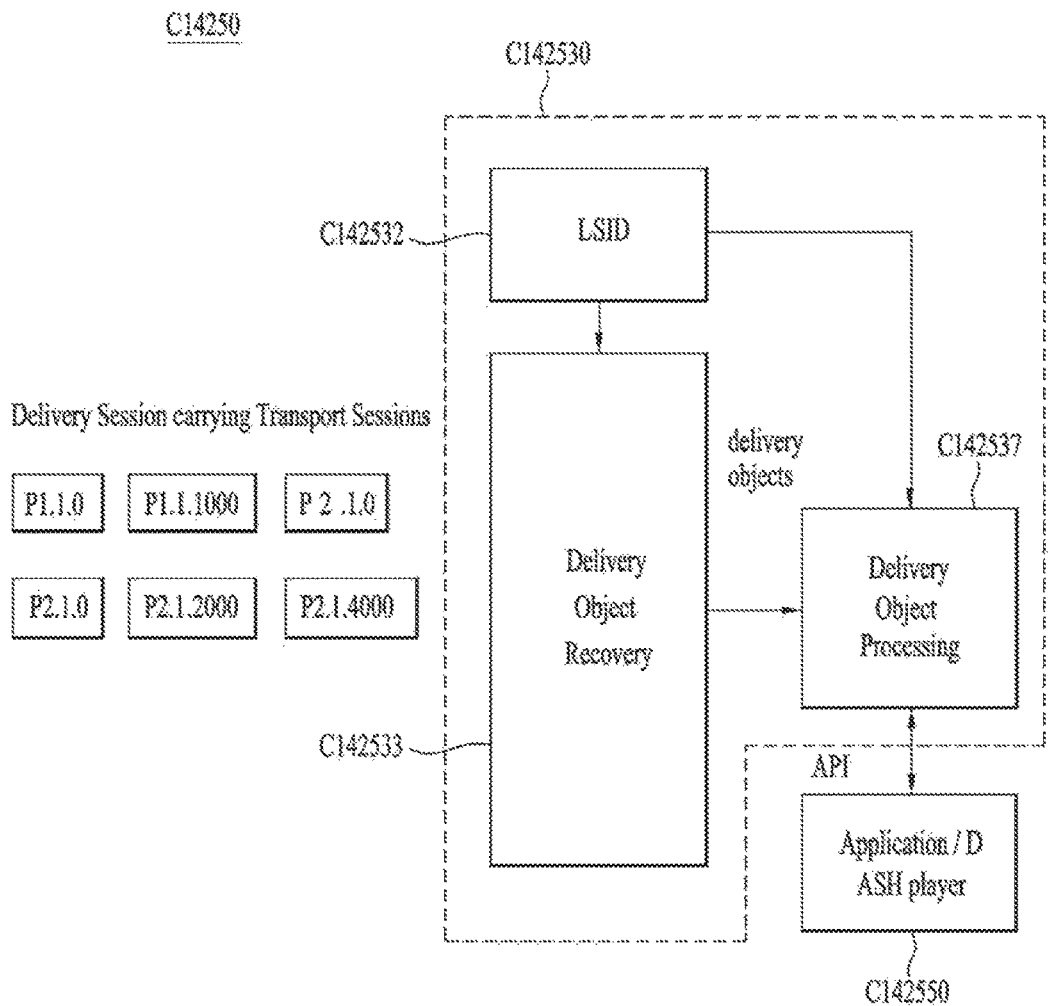
FIG. 14 is a block diagram illustrating a broadcast reception apparatus according to an embodiment of the present invention.

FIG. 14 illustrates a broadcast reception apparatus according to an embodiment of the present invention.

A controller C14250 of the broadcast reception apparatus may include at least one of a ROUTE receiver C142530 and/or a DASH client (application/DASH player) C142550.

The ROUTE receiver C142530 may receive a broadcast service, and restore signaling information and/or at least one delivery object. The ROUTE receiver C142530 may restore the signaling information and/or the at least one delivery object based on a packet including the broadcast service. The ROUTE receiver C142530 may include at least one of a packet receiver (not illustrated), a signaling parser (LSID) C142532, a delivery object processor (object recovery or delivery object recovery block) C142533, and/or a delivery object cache (delivery object processing) C142537.

The packet receiver may receive at least one packet including the broadcast service. For example, the packet may include an LCT packet.

The signaling parser C142532 may extract signaling information that provides discovery and acquisition of at least one content component of a service.

The signaling information may include first information that describes a transmission session for transmitting at least one content component of a service. For example, the first information may include SLS, LSID, and/or S-TSID. The first information may include second information that describes source data transmitted through the transmission session. For example, the second information may include a SourceFlow element. The SourceFlow element may define a source flow in a session.

The delivery object processor C142533 may restore at least one delivery object based on the signaling information. The delivery object processor C142533 may restore at least one delivery object and/or signaling information related to a source protocol based on at least one packet including the broadcast service using the delivery object recovery block.

Figure provides an overview of the basic receiver operation. The receiver receives packets and filters these packets accordingly. From the ROUTE session and each contained LCT transport session it regenerates delivery objects that are passed to the appropriate handler in order to process the data further.

The basic receiver information is provided below. In addition, the treatment in case of different received objects is provided in the remainder of this section.

The LCT Session Instance Description (LSID) contains information that describes the carried object flows. Upon receipt of each payload, the receiver proceeds with the following steps in the order listed.

Firstly, The ROUTE receiver shall parse the LCT and ROUTE (ALC) header and verify that it is a valid header. If it is not valid, then the payload shall be discarded without further processing.

Secondly, The ROUTE receiver shall assert that the TSI and the CodePoint provide valid operation points in the LSID, i.e. the LSID contains an entry for the TSI value provided in the packet header as well as an entry for this TSI that contains an entry with PayloadFormat@codePoint set to the value of the CodePoint field in the LCT header.

Thirdly, The ROUTE receiver should process the remainder of the payload, including interpreting the other payload header fields appropriately, and using the source FEC Payload ID (to derive the start offset) and the payload data to reconstruct the corresponding object as follows:

a. The ROUTE receiver can determine the object associated with the received ROUTE packet payload via the LSID and the TOI carried in the LCT header.

b. Upon receipt of the first ROUTE payload for an object, the ROUTE receiver uses the maxTransportSize attribute of the EFDT to determine the maximum length T' of the object.

c. The ROUTE receiver allocates buffer space for the T' bytes that the object may occupy.

d. The ROUTE receiver also computes the length of the payload, Y, by subtracting the payload header length from the total length of the received payload.

e. The ROUTE receiver allocates a Boolean array RECEIVED[0 . . . T'−1] with all T entries initialized to false to track received object symbols. The ROUTE receiver keeps receiving payloads for the object block as long as there is at least one entry in RECEIVED still set to false or until the object expires or until application decides to give up on this object. More details are provided below.

f. For each received ROUTE payload for the object (including the first payload), the steps to be taken to help recover the object are as follows: i) Let X be the value of the start offset field in in the ROUTE packet header and let Y be the length of the payload, Y, computed by subtracting the LCT header size and the ROUTE (ALC) header size from the total length of the received packet. ii) The ROUTE receiver copies the data into the appropriate place within the space reserved for the object and sets RECEIVED[X . . . X+Y−1]=true. iii) If all T entries of RECEIVED are true, then the receiver has recovered the entire object.

g. Once the ROUTE receiver receives a ROUTE packet with the B flag set to 1, it can determine the transfer length T of the object as X+Y of the corresponding ROUTE payload and adjust the Boolean array RECEIVED[0 . . . T'−1] to RECEIVED[0 . . . T−1].

Once a complete TOI is recovered the metadata for the delivery object is recovered and the object is handed to the application.

Metadata recovery depends on the applied delivery mode.

If a delivery object is received then it is relevant that the application can make use of the received delivery object. Typically, delivery objects are only handed to the application if they are complete and intact.

However, in certain circumstances a partially received object may be handed off, if the application API permits this and if sufficient metadata is available to enable this handling. One defined mechanism for this is described in 3GPP TR 26.946. If an object is received in the file mode, then the extended FDT is used to recover all metadata. If an object is received in the entity mode, then the entity header and the entity body are treated according to RFC 2616. If a delivery object is received in packaged mode, then the receiver shall un-package the files prior handing those to the application and provide the metadata that is included in the package.

The delivery object cache C142537 may store the signaling information and/or the at least one delivery object, and deliver the signaling information and/or the at least one delivery object to the DASH client C142550. The delivery object cache C142537 may deliver the signaling information and/or the at least one delivery object to the DASH client C142550 based on timing information.

The DASH client C142550 may decode the broadcast service. The DASH client C142550 may decode at least one delivery object using an application. The application may consume at least one delivery object. For example, the application may include DASH media presentation.

Figure 15:
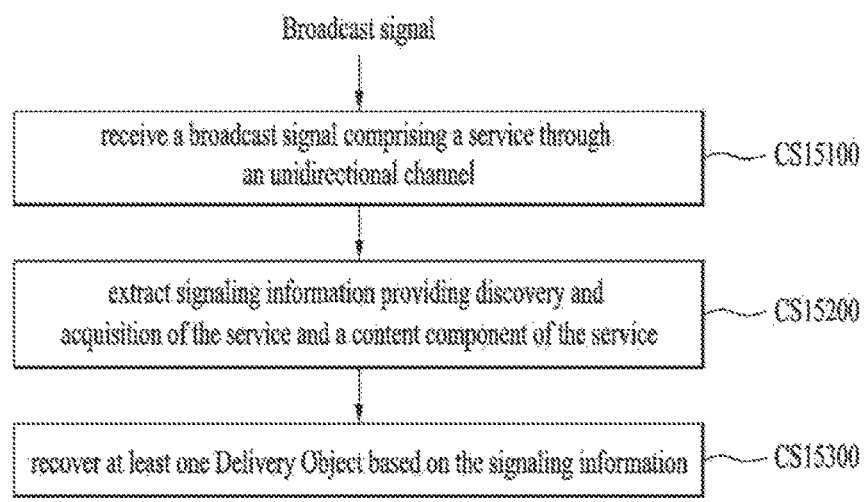
FIG. 15 is a flowchart illustrating an operation of the broadcast reception apparatus according to an embodiment of the present invention.

FIG. 15 illustrates an operation of the broadcast reception apparatus according to an embodiment of the present invention.

The broadcast reception apparatus may receive a broadcast service using at least one of a broadcast network (for example, broadcast) and/or an Internet protocol network (for example, broadband Internet), and decode the broadcast service. The broadcast reception apparatus may include at least one of a broadcast interface, a broadband interface, and/or a controller. A controller of the broadcast reception apparatus may include at least one of a ROUTE receiver and/or a DASH client. The ROUTE receiver may include at least one of a packet receiver, a signaling parser, a delivery object processor, and/or a delivery object cache. Details of the broadcast reception apparatus have been described above.

The broadcast reception apparatus may receive a broadcast signal including the broadcast service using at least one of the broadcast interface and/or the broadband interface. For example, the broadcast reception apparatus may receive a broadcast signal including a service through a unidirectional channel (CS15100).

The broadcast reception apparatus may extract signaling information that provides discovery and acquisition of at least one content component of the service using the controller (CS15200).

The signaling information may include first information that describes a transmission session for transmitting the at least one content component of the service. For example, the first information may include SLS, LSID, and/or S-TSID. Alternatively, the signaling information may include ROUTE session description, LCT transport session description (or LCT Session Description), and/or delivery object metadata (or object metadata).

The first information may include second information that describes source data transmitted through the transmission session. For example, the second information may include a SourceFlow element. The SourceFlow element may define a source flow in a session.

The second information may include at least one of an EFDT element that specifies details of file delivery data, an idRef attribute that identifies the EFDT element, a realtime attribute that indicates whether the delivery object is transmitted in real time, a minBufferSize attribute that defines a maximum amount of data necessary to be stored in the receiver, an ApplicationIdentifier element that provides information which can be mapped to an application, and/or a PayloadFormat element that defines a payload format of a packet transmitting the delivery object.

The PayloadFormat element may include at least one of a codePoint attribute that defines a CodePoint value used for a payload, a deliveryObjectFormat attribute that specifies a payload format of the delivery object, a fragmentation attribute that indicates a unit of the delivery object, a deliveryOrder attribute that indicates a transmission order of packets including data of the delivery object, a sourceFecPayloadID attribute that defines a format of a source FEC payload ID, and/or an FECParamenters element that defines FEC parameters.

The EFDT element may include at least one of an idRef attribute that identifies the EFDT element, a version attribute that indicates a version of the EFDT element, a maxExpiresDelta attribute that indicates a maximum expiration time for an object in the transmission session, a maxTransportSize attribute that indicates a maximum transmission size of an object described by the EFDT element, and/or a FileTemplate element that specifies a URL of a file.

The broadcast reception apparatus may restore the at least one delivery object based on the signaling information using the controller (CS15300).

The broadcast reception apparatus may decode the broadcast service and/or the at least one delivery object using the controller.

Figure 16:
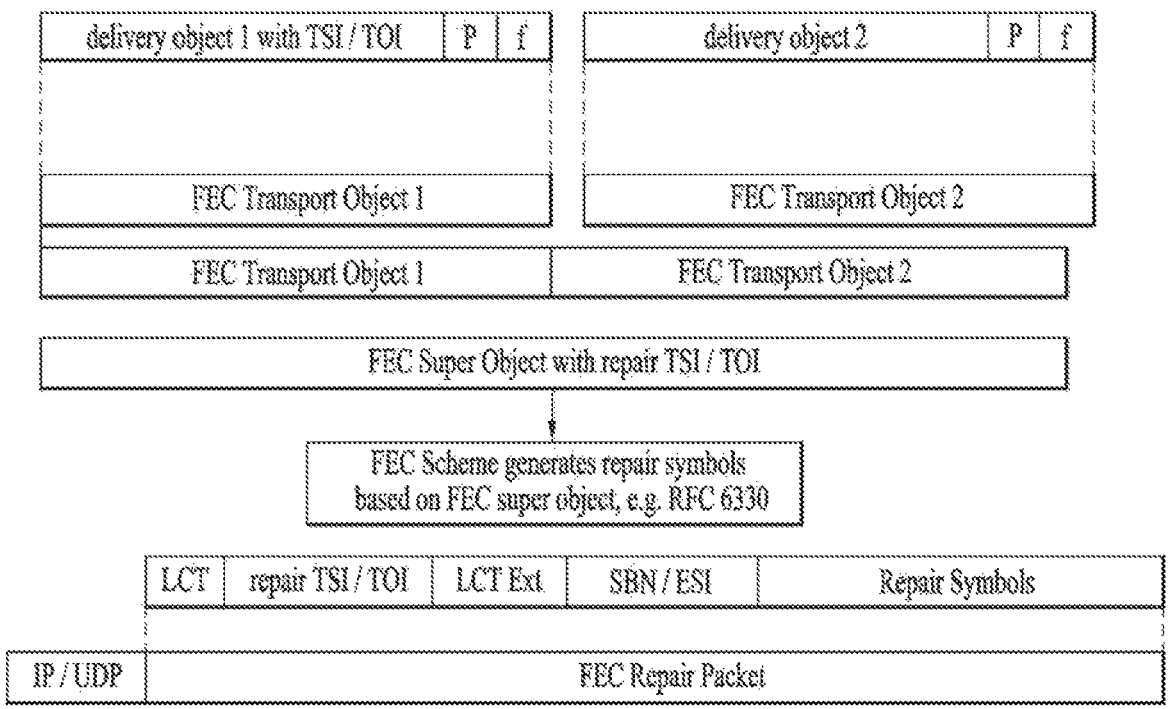
FIG. 16 is a diagram illustrating FEC packet generation of the broadcast reception apparatus according to an embodiment of the present invention.

FIG. 16 illustrates FEC packet generation of the broadcast reception apparatus according to an embodiment of the present invention.

The delivery objects and bundles of delivery objects delivered with the protocol above may be protected with FEC. The base protocol avoids including any FEC-specific signaling.

An FEC framework is defined that enables FEC protection of individual or bundles of delivery objects when using the source protocol. The FEC framework uses concepts of the FECFRAME work as defined in RFC 6363 as well as the FEC building block, RFC 5052, adopted in the existing FLUTE/ALC/LCT specifications.

The FEC design adheres to the following principles. FEC-related information is provided only where needed. Receivers not capable of this framework can ignore repair packets. The FEC is symbol-based with fixed symbol size per protected repair flow. The ALC protocol and existing FEC schemes are reused. A FEC repair flow provides protection of delivery objects from one or more source flows. The FEC specific components of the FEC framework are FEC repair flow declaration, FEC transport object, FEC super object, FEC protocol, and/or packet structure. FEC repair flow declaration includes all FEC specific information. FEC transport object is the concatenation of a delivery object, padding octets and size information in order to form a symbol-aligned chunk of data. FEC super object is the concatenation of one or more FEC transport objects in order to bundle FEC transport objects for FEC protection.

A receiver needs to be able to recover delivery objects from repair packets based on available FEC information.

FEC Protocol specifies the protocol elements for the FEC Framework. Five components of the protocol are defined and are described. The components are 1) FEC transport object construction, 2) FEC super-object construction as the concatenation of FEC transport objects, 3) TOI mapping, and/or 4) Repair packet generation.

The operation of the FEC Framework is governed by Repair Flow definition.

Figure shows the FEC packet generation based on two delivery objects.

FEC Transport Object Construction.

In order to identify a delivery object in the context of the Repair protocol, the following information is needed. The information is TSI and TOI of the delivery object. And the information is octet range of the delivery object, i.e. start offset within the delivery object and number of subsequent and contiguous octets of delivery object that constitutes the FEC object (i.e. FEC protected portion of the source object).

Typically the first mapping is applied, i.e. delivery object is an FEC Object.

For each delivery object, the associated FEC transport object is comprised of the concatenation of the delivery object, padding octets (P) and the FEC object size (F) in octets, where F is carried in a 4-octet field. The FEC transport object size S, in symbols, shall be an integer multiple of the symbol size T.

S is determined from the session information and/or the repair packet headers. F is carried in the last 4 octets of the FEC transport object.

Specifically, let F be the size of the delivery object in octets. Let F be the F octets of data of the delivery object. Let f denote four octets of data carrying the value of F in network octet order (high order octet first). Let S be the size of the FEC transport object with $S=\text{ceil}((F+4)/T)$. Let P be $S*T-4-F$ zero octets of data, i.e. padding placed between the delivery object and the value of F at the end of the FEC transport object. Let O be the concatenation of F, P and f. O then constitutes the FEC transport object of size $S*T$ octets. Note that padding octets and the object size F are NOT sent in source packets of the delivery object, but are only part of an FEC transport object that FEC decoding recovers in order to extract the FEC object and thus the delivery object or portion of the delivery object that constitutes the FEC object. In the above context, the FEC transport object size in symbols is S.

The general information about an FEC transport object that is conveyed to an FEC enabled receiver is the source TSI, source TOI and the associated octet range within the delivery object comprising the associated FEC object. However, as the size in octets of the FEC object is provided in the appended field within the FEC transport object, the remaining information can be conveyed as TSI and TOI of the delivery object from which the FEC object associated with the FEC transport object is generated. And the remaining information can be conveyed as start octet within delivery object for the associated FEC object. And the remaining information can be conveyed as size in symbols of the FEC transport object.

Super-Object and FEC Repair for Delivery Objects.

From the FEC repair flow declaration, the construction of an FEC super-object as the concatenation of one or more FEC transport objects can be determined. The FEC super-object includes the general information about the FEC transport objects as described in the previous subsection, as well as the order of the FEC transport objects within the FEC super-object. Let N be the total number of FEC transport objects for the FEC super-object construction. And, For $i=0, \ldots, N-1$, let $S[i]$ be the size in symbols of FEC transport object i. And, Let B be the FEC super-object which is the concatenation of the FEC transport objects in order, which is comprised of $K=\text{sum } (i=0) (N-1) S[i]$ source symbols.

For each FEC super-object the remaining general information that needs to be conveyed to an FEC enabled receiver, beyond what is already carried in the FEC transport objects that constitute the FEC super-object is the total number of FEC transport objects N. And, For each FEC transport object, the remaining general information that needs to be conveyed to an FEC enabled receiver is the TSI and TOI of the delivery object from which the FEC object associated with the FEC transport object is generated, start octet within delivery object for the associated FEC object, size in symbols of the FEC transport object.

The carriage of the information is discussed below.

Repair Packet Structure.

The repair protocol is based on Asynchronous Layered Coding (ALC) as defined RFC 5775 and the LCT Layered Coding Transport (LCT) Building Block as defined in RFC 5651 with the following details.

The Layered Coding Transport (LCT) Building Block as defined in RFC 5651 is used as defined in Asynchronous Layered Coding (ALC). In addition, the following constraints apply. The TSI in the LCT header shall identify the repair flow to which this packet applies, as defined by the @tsi attribute. The first bit of the SPI shall be set to 0, i.e. it indicates a repair packet. FEC configuration information may be carried in LCT extension headers.

The FEC building block is used according to RFC 5053 and RFC 6330, but only repair packets should be delivered. Each repair packet within the scope of the repair flow (as indicated by the TSI field in the LCT header) shall carry the appropriate repair TOI. The repair TOI shall be unique for each FEC super-object that is created within the scope of the TSI.

Summary FEC Information.

For each super-object (identified by a unique TOI within a Repair Flow and associated to a Repair Flow by the TSI in the LCT header) that is generated the following information needs to be communicated to the receiver. For example, the FEC configuration including FEC encoding ID, FEC_OTI, and/or additional FEC information. And, the total number of FEC objects included in the FEC super-object. And, For each FEC transport object, delivery object TSI and TOI used to generate the FEC object associated with the FEC transport object, start octet within delivery object of the associated FEC object if applicable, and/or the size in symbols of the FEC transport object.

This information may be delivered statically in the RepairFlow declaration and/or dynamically in an LCT extension header, and/or as a combination of the above, etc.

Figure 17:
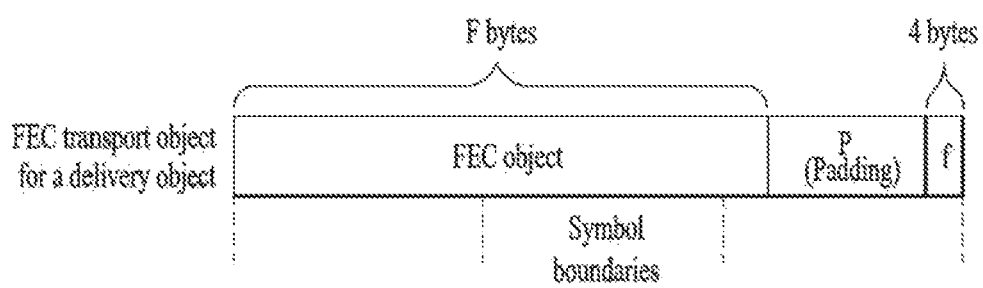
FIG. 17 is a diagram illustrating an FEC transport object according to an embodiment of the present invention.

FIG. 17 illustrates an FEC transport object according to an embodiment of the present invention.

Figure shows a FEC Transport Object Construction (Example with S=3).

FIG. 18 illustrates an EXT_TOL header according to an embodiment of the present invention.

Either the EXT_FTI or the EXT_TOL header shall be used to extract any relevant FEC Transport Information.

Figure shows the EXT_TOL24 and the EXT_TOL56 Header. It is an extension header that enables distribution of the transport object length. The size of the Transfer Length may either be 24 bit or 56 bit.

FIG. 19 illustrates a RepairFlow Element according to an embodiment of the present invention.

In the delivery of ATSC services, a repair flow declaration may be included as a fragment of a bundle description or a use service description.

As part of the repair flow declaration, a repair flow identifier is provided for the repair flow in the @tsi attribute, and all repair flows shall be declared to be of type RepairFlow. The combination of the IP address, the port and the repair flow identifier provide a unique identifier amongst all flows within a user service. Note that an IP/port combination may carry different FEC repair data as well as source data. In this case, the data is differentiated by the different TSI values in the LCT header.

The repair flow declaration indicates the pattern of delivery objects (or octet ranges of delivery object) from source flows that are to be protected by the repair flow.

Figure shows the semantics of the repair flow.

RepairFlow element defines a repair flow in session. The RepairFlow element includes FECParameters element. The FECParameters element defines FEC Parameters (better structuring may be suitable necessary). The FECParameters element includes at least one of fecEncodingId attribute, maximumDelay attribute, overhead attribute, minBufferSize attribute, FECOTI element, and/or ProtectedObject element.

The fecEncodingId attribute specifies the applied FEC scheme.

The maximumDelay attribute specifies the maximum delivery delay between any source packet in the source flow and the repair flow.

The overhead attribute specifies the overhead in percentage.

The minBufferSize attribute specifies the required buffer size. If present then this attribute defines the minimum buffer size that is required to handle all associated objects that are assigned to a super-object.

The FECOTI element specifies the FEC Object Transmission Information (FEC OTI) as defined in RFC 5052. FEC_OTI corresponds to FEC related information associated with an object as well as FEC information associated with the encoding symbols of the object is to be included within this declaration and applies to all repair packets with the repair flow.

The ProtectedObject element specifies the source flow protected by the Repair Flow and the details on how the protection is done.

FIG. 20 illustrates a ProtectedObject Element according to an embodiment of the present invention.

ProtectedObject Element defines how certain delivery objects of a collection of objects are included in the repair flow. ProtectedObject Element includes at least one of sessionDescription attribute, tsi attribute, sourceTOI attribute, and/or fecTransportObjectSize attribute.

The sessionDescription attribute references the session description that contains the Source Flow. If not present, the source flow is contained in the same session as the repair flow.

The tsi attribute specifies transport session identifier for the source flow to be protected.

The sourceTOI attribute specifies the TOI of the delivery object corresponding to the TOI included in the repair flow. If not present, the source TOI is the same as the repair TOI.

The fecTransportObjectSize attribute specifies the default size of each FEC transport object, in units of symbols. If not present then these values shall be provided in the repair packets using the EXT_TOL header. If present, the EXT_TOL header shall not be present.

TOI Mapping.

If the repair flow declaration contains a ProtectedObject, then the @sourceTOI attribute specifies a mapping of the repair TOI value contained in a repair packet to a source TOI of a delivery object that the repair packet protects.

The mapping is described through an equation in C Language format whereby the TOI field of the repair flow is specified as the variable TOI and the result of the equation determines the source TOI. The value of the attribute shall be a proper C equation with at most one variable TOI and without the addition of the ";" sign. If no @sourceTOI attribute is provided in the ProtectedObject then the default equation sourceTOI="TOI" shall be applied to derive the source TOI from the repair TOI.

FIG. 21 illustrates RepairFlow Declaration according to an embodiment of the present invention.

In Figure, a repair packet with TSI value 10 and TOI 20 protects the delivery object with TOI 20 from the source flow with TSI 1. The FEC transport object size is defined and is 892 symbols. The repair flow declaration is provided below:

FIG. 22 illustrates RepairFlow Declaration according to an embodiment of the present invention.

In Figure, since no @sourceTOI attribute is provided in the ProtectedObject then the default equation sourceTOI="TOI" is used to derive the source TOI from the TOI. Thus, the super-object that is protected by a repair packet with TSI 11 and TOI 20 is the concatenation of the FEC transport object for the delivery object with TSI 2 and TOI 20 and the FEC transport object for the delivery object with TSI 3 and TOI 20. The FEC transport object size in both cases is defined and the FEC super-object has a total size of 2232 symbols.

All three flows are delivered in the same session.

FIG. 23 illustrates RepairFlow Declaration according to an embodiment of the present invention.

In Figure, the FEC super-object that is protected by a repair packet with TSI 12 and TOI 20 is the concatenation of the FEC transport object for the delivery object with TSI 4 and TOI 40, the FEC transport object for the delivery object with TSI 5 and TOI 20 and the FEC transport object for the delivery object with TSI 4 and TOI 41. In this example, the FEC transport object sizes of the delivery objects are not included in the repair flow declaration.

Note that the sequence of the ProtectedObject declarations within a RepairFlow declaration determines the order of the FEC transport objects for the delivery objects in the super-object.

FIG. 24 illustrates RepairFlow Declaration according to an embodiment of the present invention.

In Figure, a repair packet with TSI 13 and TOI 20 protects the delivery object with TSI 6 and TOI 21.

FIG. 25 illustrates RepairFlow Declaration according to an embodiment of the present invention.

In Figure, a repair packet with TSI 14 and TOI 10 protects the concatenation of the FEC transport objects for two delivery objects: the delivery object with TSI 7 and TOI 20 and the delivery object with TSI 7 and TOI 21. The following repair flow declaration with TSI 14 provides the static FDD.

The ordering of the FEC transport objects in the FEC super-object is the same as the order in which the ProtectedObject declarations are made in the RepairFlow declaration. Thus, in example 5, the FEC super-object corresponding to a repair packet with TSI 14 and TOI 10 is the concatenation of the FEC transport object for the delivery object with TSI 7 and TOI 20 and the FEC transport object for the delivery object with TSI 7 and TOI 21.

FIG. 26 illustrates a broadcast reception apparatus according to an embodiment of the present invention.

A controller C26250 of the broadcast reception apparatus may include at least one of a ROUTE receiver C262530 and/or a DASH client (application/DASH player) C262550.

The ROUTE receiver C262530 may receive a broadcast service, and restore signaling information and/or at least one delivery object. The ROUTE receiver C262530 may restore the signaling information and/or the at least one delivery object based on a packet including the broadcast service. The ROUTE receiver C262530 may include at least one of a packet receiver (not illustrated), a signaling parser (LSID) C262532, a delivery object processor (delivery object recovery and FEC) C262535, and/or a delivery object cache (delivery object processing) C262537. The delivery object processor C262535 may include at least one of an object recovery block and/or an FEC decoder.

The packet receiver may receive at least one packet including the broadcast service. For example, the packet may include an LCT packet.

The signaling parser C262532 may extract signaling information that provides discovery and acquisition of at least one content component of a service.

The signaling information may include first information that describes a transmission session for transmitting at least one content component of a service. For example, the first information may include SLS, LSID, and/or S-TSID. The first information may include second information that describes source data transmitted through the transmission session. For example, the second information may include a SourceFlow element and/or a RepairFlow element. The SourceFlow element may define a source flow in a session. The RepairFlow element may define a repair flow in the session.

The delivery object processor C262535 may restore at least one delivery object based on the signaling information using the object recovery block. The object recovery block may restore at least one delivery object and/or signaling information related to a source protocol based on at least one packet including the broadcast service.

The delivery object processor C262535 may restore at least one delivery object and/or signaling information related to a repair protocol based on the at least one packet including the broadcast service using the FEC decoder. For example, the FEC decoder may restore the at least one delivery object and/or the signaling information related to the repair protocol based on the at least one packet.

For robust reception, FEC may be applied. In this case, one or several repair flows are sent along with the source packet streams. The repair flows are described in the RepairFlow description.

The relevant aspect in a ROUTE environment is to recover the delivery objects based on incoming LCT packets and additional information provided in the LSID that may include the a repair packet flow. There are different options. For example, no FEC is provided at all and the packets are recovered from the source packets. FEC is provided individually for each delivery objects. One FEC is provided over a multitude of delivery objects. Multiple FEC streams are provided over a different set of delivery objects.

In addition, it may be up to the receiver to decide to use none, one or multiple of the FEC streams. Hence, each flow typically gets assigned an individual recovery property, which defines aspects such as the delay and the required memory if one or the other is chosen. The receiver may select one or several repair flows, depending on its mode of operation. Among others the receiver may decide to select or not select repair flows based on the following considerations.

First consideration is the desired start-up and end-to-end latency. If a repair flow requires significant amount of buffering time to be effective, such a repair flow may only be used in time-shift operations or in worse transmit conditions, but one sacrifices the end-to-end latency.

Second consideration is the FEC capabilities, i.e. the receiver may pick only the FEC algorithm that it supports.

Third consideration is the protected source flows that are included, for example if the repair flow protects source flows that are not selected by the receiver, then it may not select the repair flow.

Other considerations are such as buffer sizes, reception conditions, etc.

If a receiver subscribes to a certain repair flow then it must subscribe to all source flows that are protected by the repair flow and collect the relevant packets.

To be able to recover the delivery objects that are protected by a repair flow, a receiver needs to obtain the required RepairFlow fragments that describe the corresponding collection of delivery objects that are covered by this Repair Flow. A repair flow is defined by the combination of an LCT session as well as a unique TSI number as well as the corresponding protected source flows.

If a receiver subscribes to a repair flow, it shall collect all packets of all protected Transport Sessions.

Upon receipt of each packet, source or repair packet, the receiver proceeds with the following steps in the order listed.

Firstly, the receiver shall parse the packet header and verify that it is a valid header. If it is not valid, then the packet shall be discarded without further processing.

Secondly, the receiver shall parse the code TSI and verify that the TSI is associated to the Repair Flow or the associated Protected source flow. If it is not valid, then the packet shall be discarded without further processing.

Thirdly, the receiver processes the remainder of the packet, including interpreting the other header fields appropriately, and using the FEC Payload ID (which determines start byte for source objects) and the Repair FEC Payload ID as well as the payload data to reconstruct decoding blocks corresponding to a super-object as follows.

a) For a source packet, the receiver determines from which delivery object a received packet was generated by the session information and the TOI carried in the payload header. For a repair object the receiver determines for which super-object a received packet was generated by the session information and the TOI carried in the payload header.

b) For source packets, the receiver collects the data for each super-object and recovers super-objects. The received super-object is then mapped to a source-block and the corresponding encoding symbols are generated.

c) With the reception of the repair packets, the super-object can be recovered.

d) Once the super-object is recovered, the individual delivery objects can be extracted.

The delivery object cache C262537 may store signaling information and/or at least one delivery object, and deliver the signaling information and/or the at least one delivery object to the DASH client C262550. The delivery object cache C262537 may deliver the signaling information and/or the at least one delivery object to the DASH client C262550 based on timing information.

The DASH client C262550 may decode the broadcast service. The DASH client C262550 may decode at least one delivery object using an application. The application may consume the at least one delivery object. For example, the application may include DASH media presentation.

FIG. 27 illustrates an MPD according to an embodiment of the present invention.

Delivering MPEG-DASH content enables the delivery of real-time media over a unidirectional transport. Whereas MPEG-DASH content may be treated as regular objects, the delivery can be optimized to support controlled latency, controlled joining time and additional optimizations.

This section provides an overview on, suitable MPEG-DASH formatted content for live services, the use of ROUTE for the delivery of source content, appropriate packet scheduling, and/or optimized receiver behavior.

Suitable MPEG-DASH Formatted Content for Linear TV Services.

With reference to Baseline Technologies, The encoded bitstreams are segmented and packaged according to the MPEG DASH ISO BMFF live profile. This includes, but is not limited to which the Segment Template is used for URL addressing of Segments and to which each Segment starts with a stream access point of type 1 or 2.

In addition the settings of the DASH-IF Interoperability Points (which includes HEVC) are recommended to be applied, including non-multiplexed Representations. Further optimizations are discussed before.

An overview of the basic settings is provided.

The duration of the media data in the Segments (Segment duration) is typically constant signaled by the @duration attribute. The maximum tolerance of Segment duration does not typically exceed ±50% and the maximum accumulated deviation over multiple Segments is ±50% of the signaled Segment duration. Such fluctuations in actual Segment duration may be caused by for example ad replacement or specific IDR frame placement.

For video, the signaling of width, height and frame rate is added.

For audio, the signaling of the language is added.

For subtitles or captions, the signaling of the role of the subtitles or captions is to be added. In addition, the signaling of the language is to be added if different than the language of the audio.

For providing a basic linear media streaming service based on DASH the following parameter settings are suitable.

Firstly, MPD@type is set to dynamic.

Secondly, MPD@availabilityStartTime is set to any suitable value that expresses the start time of the Media Presentation such that Segment availabilities can be computed.

Thirdly, MPD@minimumUpdatePeriod is expected to be present. If the MPD@minimumUpdatePeriod is provided, i.e. the exact end time of the Media Presentation is unknown. Setting the value of the minimum update period primarily affects two main service provider aspects: A short minimum update period results in the ability to change and announce new content in the MPD on shorter notice. However, by offering the MPD with a small minimum update period, the client checks an update of the MPD more frequently. However, a small value does not mean that the MPD does have to be updated, it just defines the interval of possible MPD update. Therefore, in the delivery of DASH over ROUTE, the MPD@minimumUpdatePeriod may most suitably be set to be as small as 0 and in this case the client checks MPD@publishTime value specifying the wall-clock time when the MPD was generated and published at the origin server. The MPDs with earlier @publishTime can be updated to the MPDs with a later value of @publishTime.

Fourthly, Segment Duration (SDURATION). The Segment duration typically influences the end-to-end latency, but also the switching and random access granularity as in the basic profile each Segment starts with a stream access point which can also be used as switch point. In broadcast DASH delivery, i.e. no use of dynamic bitrate adaptivity, switching is of less relevance. The service provider sets the value taking into account at least one of the desired end-to-end latency, the desired compression efficiency, the start-up latency, and/or the desired switching granularity, if content is for example offered also for unicast distribution. Reasonable values for Segment durations are between 1 second and 10 seconds.

Fifthly, MPD@minBufferTime (MBT) and Representation@bandwidth (BW). the value of the minimum buffer time does not provide any instructions to the client on how much media data to buffer. The value describes how much buffer a client would have under ideal network conditions. As such, MBT is not describing the burstiness or jitter in the network; it is describing the burstiness or jitter in the content encoding. Together with the BW value, it is a property of the content. Using the "leaky bucket" model, it is the size of the bucket such that the product of @minBufferTime and @bandwidth represents the worst-case burstiness/jitter of content encoding. The minimum buffer time provides information that for each Stream Access Point (and in the typical case that each Media Segment starts with a SAP, this holds for the start of the each Media Segment), the property of the stream: If the Representation (starting at any Segment) is delivered over a constant bitrate channel with bitrate equal to value of the BW attribute then each Segment with presentation time PT is available at the client latest at time with a delay of at most PT+MBT. The MBT typically may for example be set to the coded video sequence size of the content.

Sixthly, MPD@timeShiftBufferDepth (TSB). If the content is to be consumed at the live edge, then the time shift buffer depth is set short. However, it is recommended that the TSB is not smaller than the recommended value of 4*SDURATION and 6 seconds in media time in order for the client to do some pre-buffering in more difficult network conditions. Note, the shorter the timeShiftBufferDepth the better the time synchronization between client and segmenter. If no restrictions on the accessibility of the content are provided, then the TSB may be set to a large value that even exceeds the media presentation duration. However, the TSB cannot exceed the capabilities of the client. When joining, the MBMS client may change this value in the MPD before forwarding it to the application to avoid that the client requests data, which is not yet received.

Seventhly, MPD@suggestedPresentationDelay (SPD). If synchronized play-out with other devices adhering to the same rule is desired and/or the service providers wants to define the typical live edge of the program, then this value is provided. The service provider sets the value taking into account at least one of the desired end-to-end latency, the typical required buffering in the client, for example based on the network condition, the Segment duration SDURATION, and/or the time shift buffer depth TSB. In general, reasonable value may be 2 to 4 times of the Segment duration SDURATION, but it is recommended as a guideline that the time is not smaller than 4 seconds in order for the client to enable building sufficient buffer. However, for DASH over MBMS the value may be smaller as delivery guarantees minimize the jitter.

With reference to DASH Optimizations (Shorter Open-GOP Segments), in the basic profile discussed above, the issue is that as soon as the Segments need to short, for example in the sub-second range, each Segment requires to start with an IDR-like SAP type. This constraint unnecessarily restricts coding efficiency.

Therefore, it is proposed to adopt a profile for which full random access SAPs (type 1 or 2) are only positioned less frequent, but SAP type 3 (open GOPs) is enabled as well. This allows fast tune-in at open GOPs at the start of each Segment.

Usage of ROUTE for Live Service.

In order to support DASH Streaming over ROUTE, the MPD for a service can be delivered as an object or metadata fragment. The following mapping is applied.

Firstly, the ROUTE session delivers all objects that are referenced by the MPD, all updates of the MPD and objects that are referenced by any update of the MPD.

Secondly, if a Segment is delivered as a ROUTE object then all of the following hold. a) The LCT session delivers Segments such that the last packet of the delivered object is available at the receiver no later than its Segment availability start time as announced in the MPD. b) The Content-Location element in the FDT (or derived by the EFDT) for the delivered object matches the Segment URL in the MPD.

Thirdly, if an MPD update is delivered then all of the following hold. a) if the updated MPD is delivered as a FLUTE object, the Content-Location element in the FDT (or derived by the EFDT) for the delivered object matches the URI of the appropriate referenced MPD. b) The MPD update is a valid update to a previously delivered MPD.

Fourthly, if any other resource in the MPD is delivered (e.g. xlinked resource, metrics, etc.) then, a) The Content-Location element in the FDT (or derived by the EFDT) for the delivered object matches the URL of the object in the MPD. b) The ROUTE session delivers objects such that the latest time the last packet of the delivered object is available at the receiver does not occur before a DASH client operating on the delivered MPD sequence might ask for the resource.

The MPD should be delivered such that it is available at the receiver at a random access point. The MPD may be delivered out of band or in-band. If the MPD is not delivered frequently, then the ApplicationIdentifier child element of the EFDT, i.e., LSID. SourceFlow.EFDT.ApplicationIdentifier, carries DASH-specific metadata, namely the Adaptation Set/Representation Parameters such as language, rating, etc.

The Initialization Segment is delivered such that it is available at the receiver at a random access point.

With reference to Sender Operation, in order to optimize DASH delivery, the following packet generation is applied assuming that the smallest delivery and consumption units are Segments. Segments may be small to address low latency and low tune-in times. Segments are delivered in order, i.e. the start_offset is always increasing. The packet with start_offset set to zero or the packet including any stream access points includes an EXT_PRESENTATION-_TIME header that provides a mapping of the earliest presentation time to wall-clock time to synchronize the play out. the start of a packet should align with the start of a sample in the Segment. If such alignment is done such priority importance may be mapped to IP packet markings. Packets should be delivered such that there is sufficient time for Segments to process packets and decode those to be presented at the signaled presentation time.

With reference to MPD-based Reception of Receiver Operation, in a regular reception mode, the ROUTE receiver collects the objects in the following sequence. the MPD, the Initialization Segments of the selected Representations, and/or the Media Segments as they are delivered in the Transport Sessions.

Based on this information and the information in the MPD, a regular DASH client starts playing the media.

The ROUTE receiver only delivers complete objects to the receiver. If objects are lost, no data is delivered.

With reference to Error-resilient Reception of Receiver Operation, if the receiver experiences packet losses in an object, then it may discard the object. As an alternative, the ROUTE receiver may deliver partially received objects. In this case the application can decide to process such a partial object or discard it.

With reference to Quick Join of Receiver Operation, If the LSID contains Adaptation Set/Representation parameters for each Transport Session, and with the reception of a stream access point, the client may immediately start playout of the received media component with presentation scheduled according to the presentation time header. After having initiated the playout, the remaining components may be collected and the rich MPD may be used to provide additional alternatives.

Layered Coding.

For layered coding, the MPD signals the layering. An example is shown in the example MPD as copied from ISO/IEC 23009-1, Annex G5 using SVC. Note that this is only an example, but this equally applied to S-HEVC or any other layered codec. In this case all Representations are contained in one Adaptation Set. The dependencies are expressed by the @dependencyId. From a delivery perspective, each layer may preferably be delivered on a separate LCT transport session, or even in a separate ROUTE session. By providing the appropriate signaling in the ApplicationIdentifier of the LSID, preferably using the Representation Information, the layering can be appropriately expressed.

Furthermore, the layering may be further supported by applying different Repair Flows to the different Source Flows. By suitable configurations, different use cases such as fast joining only on the base layer, more robust base layers, etc. may be supported.

FIG. 28 illustrates a URI form according to an embodiment of the present invention.

In order to deliver subsets of full files as delivery objects, the Content-Location in the EFDT may use specific fragment identifiers to signal subsets. In this context, two URL fragment identifiers are introduced. byte ranges, fragments of fragment ISO BMFF formats, and/or Subsegments of DASH Representations. For some details refer to http://www.w3.org/TR/media-frags/ and http://www.w3.org/TR/2011/WD-media-frags-recipes-20111201/.

With reference to Query Parameter for Byte Range, the URL of a regular file may be extended by a query parameter as follows: &range=$first$-$last$" where $first$ and $last$ are to be replaced with a value below.

"$first$" is the identifier shall be substituted by the byte offset of the first byte in a range and shall be identical to the value of 'first-byte-pos' of 'byte-range-spec' in 14.35.1 of RFC 2616, if this request would be executed using a partial GET request.

"$last$" is the identifier is substituted by the byte offset of the last byte in the range; that is, the byte positions specified are inclusive. It shall be identical to the value of 'last-byte-pos' of 'byte-range-spec' in 14.35.1 of RFC 2616, if this request would be executed using a partial GET request.

If such a Content-Location is provided, it indicates that delivery object is the byte range between $first$ and $last$ of the object provided by the URL.

FIG. 29 illustrates a URI form according to an embodiment of the present invention.

Figure shows the URLs. With reference to URL to full object, it is represented in that "http://cdn.example.com/movies/134532/audio/en/aac64.mp4". With reference to Byte Range of delivery object, it is represented in that "1876-23456". With reference to URL to delivery object, it is represented in that "http://cdn.example.com/movies/134532/audio/en/aac64.mp4?range=1876-23456".

Figures 30, 31:
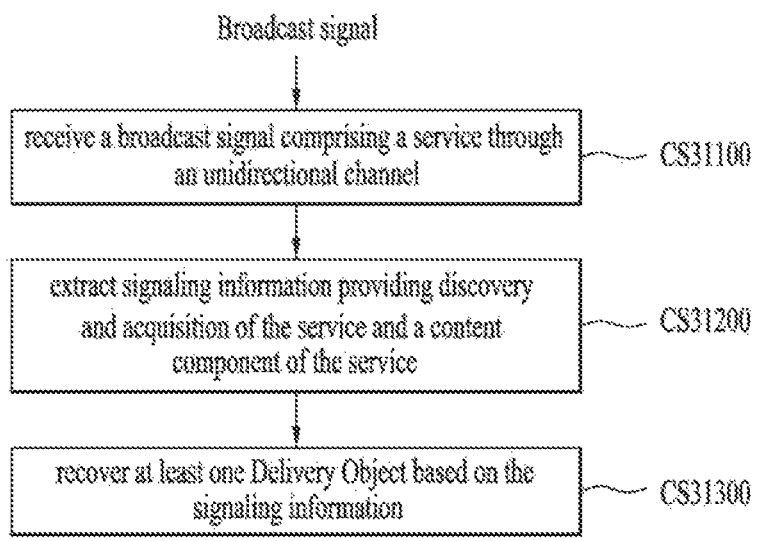
FIG. 30 is a diagram illustrating parameters for MP4 fragment identifiers according to an embodiment of the present invention.
FIG. 31 is a flowchart illustrating an operation of a receiver according to an embodiment of the present invention.

FIG. 30 illustrates parameters for MP4 fragment identifiers according to an embodiment of the present invention.

URIs for resources with MIME type video/mp4 or audio/mp4 may use URI fragment syntax to signal only a portion of the movie file, specifically only a movie fragment. This section defines a fragment identifier in order to express one fragment of a fragmented ISO BMFF file.

URI fragment starts with the '#' character, and is a string terminating the URI. MP4 fragments shall be a comma-separated list of key=value pairs, with syntax and semantics of key and value parameters defined in the Figure.

fragment parameter indicates a value of movie fragment in the ISO BMFF (movie fragment number). If 0 it points to the movie header.

subsegment parameter indicates a value of a Subsegment in a ISO BMFF/DASH Representation. If 0 it points to the movie header and the Segment index.

With reference to Examples, 27th movie fragment in ISO BMFF file is represented in that "http://www.example.com/mymovie.mp4#fragment=27".

27th to 31st movie fragment in ISO BMFF file are represented in that "http://www.example.com/mymovie.mp4#fragment=27,31".

movie header in ISO BMFF file is represented in that "http://www.example.com/mymovie.mp4#fragment=0".

movie header and first movie fragment in ISO BMFF file are represented in that "http://www.example.com/mymovie.mp4#fragment=0,1".

27th Subsegment in ISO BMFF file is represented in that "http://www.example.com/mymovie.mp4#subsegment=27".

27th to 31st Subsegment in ISO BMFF file are represented in that "http://www.example.com/mymovie.mp4#subsegment=27,31".

movie header and Segment index in ISO BMFF file are represented in that "http://www.example.com/mymovie.mp4#subsegment=0".

movie header, Segment index and first Subsegment in ISO BMFF file are represented in that "http://www.example.com/mymovie.mp4#subsegment=0,1".

With reference to Usage in ROUTE, if the EFDT includes a Content-Location, either explicitly or derived, with such a fragment or Subsegment identifier, then the delivery object shall be exactly the byte range that represents the movie fragment, the Subsegment or the sequence of movie fragments/Subsegments.

FIG. 31 illustrates an operation of a receiver according to an embodiment of the present invention.

The broadcast reception apparatus may receive a broadcast service using at least one of a broadcast network (for example, broadcast) and/or an Internet protocol network (for example, broadband Internet), and decode the broadcast service. The broadcast reception apparatus may include at least one of a broadcast interface, a broadband interface, and/or a controller. A controller of the broadcast reception apparatus may include at least one of a ROUTE receiver and/or a DASH client. The ROUTE receiver may include at least one of a packet receiver, a signaling parser, a delivery object processor, and/or a delivery object cache. The delivery object processor may include at least one of an object recovery block and/or an FEC decoder. Details of the broadcast reception apparatus have been described above.

The broadcast reception apparatus may receive a broadcast signal including the broadcast service using at least one of the broadcast interface and/or the broadband interface. For example, the broadcast reception apparatus may receive a broadcast signal including a service through a unidirectional channel (CS31100).

The broadcast reception apparatus may extract signaling information that provides discovery and acquisition of at least one content component of the service using the controller (CS31200).

For example, the broadcast reception apparatus may extract the signaling information that provides discovery and acquisition of at least one content component of the service using the signaling parser.

The signaling information may include first information that describes a transmission session for transmitting the at least one content component of the service. For example, the first information may include SLS, LSID, and/or S-TSID. Alternatively, the signaling information may include ROUTE session description, LCT transport session description (or LCT Session Description), and/or delivery object metadata (or object metadata).

The first information may include second information that describes source data transmitted through the transmission session. For example, the second information may include a SourceFlow element and/or a RepairFlow element. The SourceFlow element may define a source flow in a session. The RepairFlow element may define a repair flow in the session.

The broadcast reception apparatus may restore the at least one delivery object based on the signaling information using the controller (CS15300).

For example, the broadcast reception apparatus may restore at least one delivery object based on the signaling information using the object recovery block. The object recovery block may restore at least one delivery object and/or signaling information related to a source protocol based on at least one packet including the broadcast service.

For example, the broadcast reception apparatus may restore at least one delivery object and/or signaling information related to a repair protocol based on the at least one packet including the broadcast service using the FEC decoder.

The broadcast reception apparatus may decode the broadcast service and/or the at least one delivery object using the controller.

A module, a processing unit, a device, or a unit may be a processor that executes continuous processes stored in a memory (or storage unit). The respective steps described in the above embodiments may be performed by hardware/processors. Each module/block/unit described in the above embodiments may operate as hardware/processor. In addition, the methods proposed by the present invention may be executed as code. The code may be written to a processor-readable storage medium, and thus may be read by a processor provided in an apparatus.

Each of the method inventions according to the present invention may be implemented in a form of a program instruction executable through various computer means and recorded in a computer-readable medium.

The computer-readable medium may include, alone or in combination with the program instructions, data files, data structures, etc. The program instructions recorded in the medium may be specifically designed and configured for the present invention, or known and available to those skilled in computer software. Examples of computer-readable medium include magnetic media such as hard disks, floppy disks, and magnetic tape; optical media such as CDs and DVDs; magneto-optical media such as floptical discs; and hardware devices that are specially configured to store and perform program instructions, such as read-only memory (ROM), random access memory (RAM), flash memory, etc. Examples of program instructions include both machine code, such as is produced by a compiler, and files containing higher level code that may be executed by the computer using an interpreter. The described hardware devices may be configured to act as one or more software modules in order to perform the operations of the above-described exemplary embodiments of the present invention, or vice versa.

Although the present invention has been described using restricted embodiments and drawings, the present invention is not limited to the above embodiments. It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Various embodiments have been described in the best mode for carrying out the invention.

The present invention can be used in a general broadcasting industry.

What is claimed is:

1. A broadcast reception apparatus comprising:
  a packet receiver to receive transport packets for signaling data through a dedicated transport session with a transport session identifier 0, and receive transport packets for delivery objects through other transport sessions with different transport session identifiers from the transport session identifier 0, wherein a delivery object is a part of a file for video content of a broadcast service;
  a signaling parser to extract the signaling data delivered from the dedicated transport session including session information, the session information including an extended file delivery table providing information about delivery of the file; and
  a data processor to recover the delivery object based on the signaling data, and generate location information for the file by substituting file template information included in the extended file delivery table with a Transport Object Identifier (TOI) in a header of a transport packet for the delivery object,
  wherein a payload of the transport packet carries a contiguous portion of the delivery object starting from a beginning of a first byte value through a byte value related to a sum of the first byte value and second byte value,
  the first byte value is a value of start offset information, that is followed by the payload, in the transport packet, and
  the second byte value is a length of the payload computed by subtracting a size of the header and a size of the start offset information from a total length of the transport packet.

2. The broadcast reception apparatus according to claim 1, wherein the signaling data includes a transport session identifier for a transport session, and a DASH representation identifier representing a DASH representation for DASH formatted data in the transport session.

3. The broadcast reception apparatus according to claim 1, wherein the start offset information value indicates a starting byte position of the contiguous portion of the delivery object carried in the transport packet for the delivery object.

4. The broadcast reception apparatus according to claim 1, wherein, to recover the delivery object, the data processor is further configured to:
  determine the delivery object associated with the payload of the transport packet based on the signaling data and the TOI of the transport packet for the delivery object,
  allocate buffer space based on a maximum transport size of the delivery object indicated by the extended file delivery table, and
  copy the payload into the buffer space reserved for the delivery object.

5. A broadcast reception method comprising:
  receiving, by a broadcast reception apparatus, transport packets for signaling data through a dedicated transport session with a transport session identifier 0;
  receiving, by the broadcast reception apparatus, transport packets for delivery objects through other transport sessions with different transport session identifiers from the transport session identifier 0, wherein a delivery object is a part of a file for video content of a broadcast service;
  extracting, by the broadcast reception apparatus, the signaling data delivered from the dedicated transport session including session information, the session information including an extended file delivery table providing information about delivery of the file;
  recovering, by the broadcast reception apparatus, the delivery object based on the signaling data; and
  generating, by the broadcast reception apparatus, location information for the file by substituting file template information included in the extended file delivery table with a Transport Object Identifier (TOI) in a header of a transport packet for the delivery object,
wherein a payload of the transport packet carries a contiguous portion of the delivery object starting from a beginning of a first byte value through a byte value related to a sum of the first byte value and second byte value,
the first byte value is a value of start offset information, that is followed by the payload, in the transport packet, and
the second byte value is a length of the payload computed by subtracting a size of the header and a size of the start offset information from a total length of the transport packet.

6. The broadcast reception method according to claim 5, wherein the signaling data includes a transport session identifier for a transport session, and a DASH representation identifier representing a DASH representation for DASH formatted data in the transport session.

7. The broadcast reception method according to claim 5, wherein the start offset information value indicates a starting byte position of the contiguous portion of the delivery object carried in the transport packet for the delivery object.

8. The broadcast reception method according to claim 5, wherein the recovering of the delivery object further comprises:
    determining the delivery object associated with the payload of the transport packet based on the signaling data and the TOI of the transport packet for the delivery object;
    allocating buffer space based on a maximum transport size of the delivery object indicated by the extended file delivery table; and
    copying the payload into the buffer space reserved for the delivery object.

9. A broadcast transmission apparatus comprising:
a packet generator to generate transport packets for delivery objects, wherein a delivery object is a part of a file for video content of a broadcast service;
a signaling generator to generate signaling data,
the signaling data delivered by a dedicated transport session including session information, the session information including an extended file delivery table providing information about delivery of the file,
the extended file delivery table including file template information which is substituted with a Transport Object Identifier (TOI) in a header of a transport packet carrying the delivery object at a broadcast receiver,
wherein a payload of the transport packet carries a contiguous portion of the delivery object starting from a beginning of a first byte value through a byte value related to a sum of the first byte value and second byte value,
the first byte value is a value of start offset information, that is followed by the payload, in the transport packet, and
the second byte value is a length of the payload computed by subtracting a size of the header and a size of the start offset information from a total length of the transport packet; and
a transmitter to transmit transport packets for the signaling data through a dedicated transport session with a transport session identifier 0, and the transport packets for the delivery object through other transport sessions with different transport session identifiers from the transport session identifier 0.

10. The broadcast transmission apparatus according to claim 9, wherein the signaling data includes a transport session identifier for a transport session, and a DASH representation identifier representing a DASH representation for DASH formatted data in the transport session.

11. The broadcast transmission apparatus according to claim 9, wherein the start offset information value indicates a starting byte position of the contiguous portion of the delivery object carried in the transport packet for the delivery object.

12. A broadcast transmission method comprising:
generating transport packets for delivery objects, wherein a delivery object is a part of a file for video content of a broadcast service;
generating signaling data,
the signaling data delivered by a dedicated transport session including session information, the session information including an extended file delivery table providing information about delivery of the file,
the extended file delivery table including file template information which is substituted with a Transport Object Identifier (TOI) in a header of a transport packet carrying the delivery object at a broadcast receiver,
wherein a payload of the transport packet carries a contiguous portion of the delivery object starting from a beginning of a first byte value through a byte value related to a sum of the first byte value and second byte value,
the first byte value is a value of start offset information, that is followed by the payload, in the transport packet, and
the second byte value is a length of the payload computed by subtracting a size of the header and a size of the start offset information from a total length of the transport packet; and
transmitting transport packets for the signaling data through a dedicated transport session with a transport session identifier 0, and the transport packets for the delivery object through other transport sessions with different transport session identifiers from the transport session identifier 0.

13. The broadcast transmission method according to claim 12, wherein the signaling data includes a transport session identifier for a transport session, and a DASH representation identifier representing a DASH representation for DASH formatted data in the transport session.

14. The broadcast transmission method according to claim 12, wherein the start offset information value indicates a starting byte position of the contiguous portion of the delivery object carried in the transport packet for the delivery object.

* * * * *